(12) United States Patent
Itoh et al.

(10) Patent No.: US 8,926,100 B2
(45) Date of Patent: Jan. 6, 2015

(54) ILLUMINATION DEVICE HAVING IMPROVED ILLUMINATION LIGHT SYMMETRICALNESS AND PROJECTOR HAVING THE ILLUMINATION DEVICE

(75) Inventors: Yoshitaka Itoh, Matsumoto (JP); Hiroyasu Kaseya, Fujimi (JP); Fumika Sumiyama, Matsumoto (JP); Junichi Okamoto, Matsumoto (JP)

(73) Assignee: Seiko Epson Corporation (JP)

( * ) Notice: Subject to any disclaimer, the term of this patent is extended or adjusted under 35 U.S.C. 154(b) by 326 days.

(21) Appl. No.: 13/408,166

(22) Filed: Feb. 29, 2012

(65) Prior Publication Data

US 2012/0229775 A1 Sep. 13, 2012

(30) Foreign Application Priority Data

Mar. 8, 2011 (JP) .................. 2011-050397

(51) Int. Cl.
| | |
|---|---|
| *G03B 21/00* | (2006.01) |
| *G03B 21/14* | (2006.01) |
| *H01S 3/10* | (2006.01) |
| *H01S 5/00* | (2006.01) |
| *G02B 27/12* | (2006.01) |
| *G02B 27/30* | (2006.01) |
| *G02B 19/00* | (2006.01) |
| *G02B 27/09* | (2006.01) |

(52) U.S. Cl.
CPC ........ *G02B 19/0066* (2013.01); *G02B 27/0961* (2013.01); *G02B 27/0972* (2013.01); *G02B 19/0028* (2013.01)
USPC ................ 353/38; 353/31; 372/9; 372/50.12; 359/639; 359/641

(58) Field of Classification Search
USPC .......... 353/31, 30, 38; 372/9, 50.12; 359/629, 359/628, 639, 641
See application file for complete search history.

(56) References Cited

U.S. PATENT DOCUMENTS

| | | | | |
|---|---|---|---|---|
| 5,252,839 | A | * | 10/1993 | Fouquet .......................... 257/13 |
| 5,319,496 | A | | 6/1994 | Jewell et al. |
| 6,324,190 | B1 | * | 11/2001 | Du et al. ........................... 372/9 |
| 7,639,722 | B1 | | 12/2009 | Paxton et al. |

(Continued)

FOREIGN PATENT DOCUMENTS

| | | |
|---|---|---|
| DE | 197 35 094 | 2/1998 |
| EM | 0985952 | 3/2000 |
| WF | WO99/49358 | 9/1999 |

OTHER PUBLICATIONS

Extended European Search Report for Application No. 12 15 8220.9 mailed Jun. 13, 2012 (6 pages).

*Primary Examiner* — William C Dowling
*Assistant Examiner* — Magda Cruz
(74) *Attorney, Agent, or Firm* — Harness, Dickey & Pierce, P.L.C.

(57) ABSTRACT

An illumination device includes a light source including plural light emitting devices arranged in a pattern and that generate and guide light, the light emitting devices having tilted gain regions wherein guiding directions of the light are tilted with respect to a perpendicular of output surfaces of the light source, an optical axis conversion device that bends optical axes of the light output from the light source, and a light distribution control device that controls a light distribution angle of the light output from the optical axis conversion device, wherein the light emitting devices are super luminescent diodes, and the light output from the light distribution control device diverge.

13 Claims, 18 Drawing Sheets

(56) References Cited

U.S. PATENT DOCUMENTS

2002/0171941 A1 11/2002 Okada
2006/0045144 A1 3/2006 Karlsen et al.
2006/0126690 A1* 6/2006 Kido et al. .................. 372/43.01
2011/0051096 A1 3/2011 Mochizuki

* cited by examiner

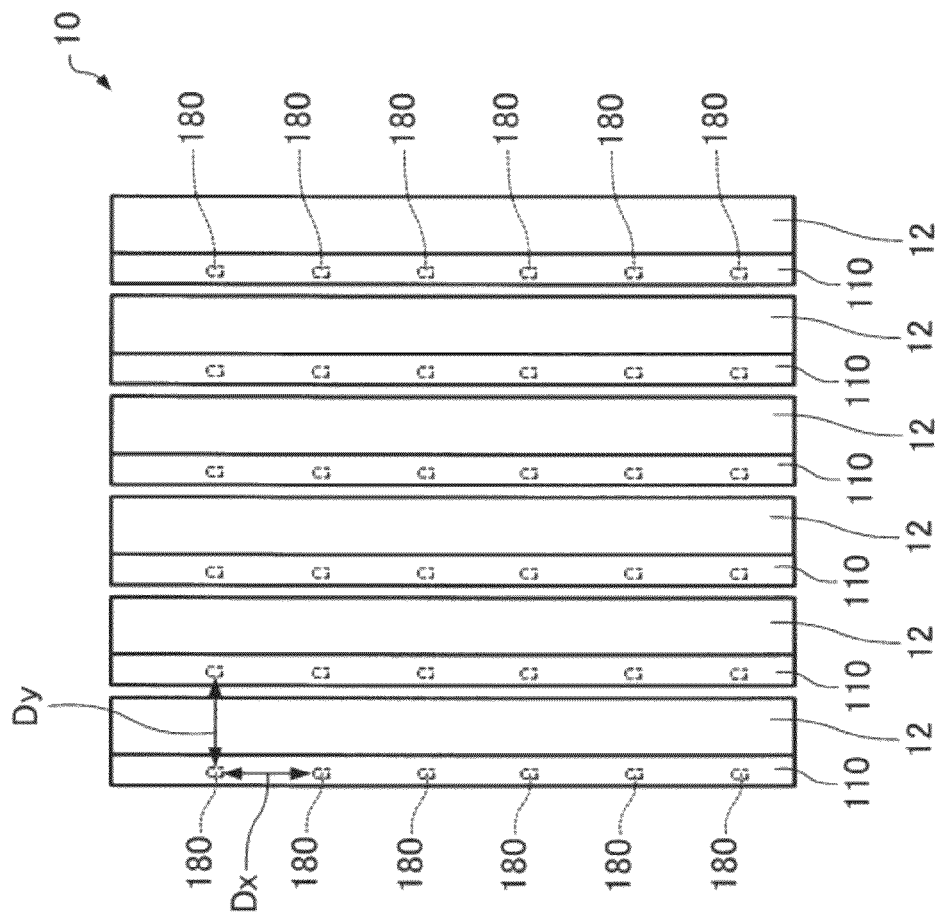
FIG. 2
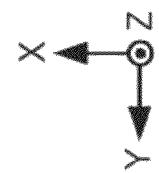

ILLUMINATION DEVICE HAVING IMPROVED ILLUMINATION LIGHT SYMMETRICALNESS AND PROJECTOR HAVING THE ILLUMINATION DEVICE

BACKGROUND

1. Technical Field

The present invention relates to an illumination device and a projector.

2. Related Art

The development of projectors using an array of light sources with plural semiconductor light emitting devices is being advanced. Known semiconductor light emitting devices include, for example, a semiconductor laser (laser diode), a super luminescent diode (hereinafter, may be referred to as "SLD"), an LED (light emitting diode), and an OLED (organic light emitting diode).

Among these devices, the SLD has a slight disadvantage with respect to light output, but has the advantage of an inherently smaller speckle noise due to the presence of a different gain region structure as compared to a semiconductor laser. However, due to a nonresonant structure in which the gain region is provided at a tilt with respect to an end surface (output surface) of a substrate with the semiconductor light emitting device formed thereon, the output light has an angular distribution with low symmetry similar to a crescent shape.

Generally, many light modulation devices used for projectors have display properties dependent on the incident angles of incident illumination light. Accordingly, to realize a projection image with high image quality, it is desirable to use illumination light having high angular distribution symmetry (which may be referred to as "symmetry of sectional shape of light") and a uniform intensity distribution. This is because angular distribution asymmetry and intensity distribution nonuniformity cause brightness irregularities and contrast irregularities.

For example, International Publication WO 99/49358 discloses an optical configuration that illuminates an image display device by using a light emitter in which plural semiconductor lasers are arranged in a two-dimensional array and parallelizing a beam output from the light emitter. In a typical edge-emitting semiconductor laser, the gain region is formed perpendicularly to the substrate end surface, the output light has an oval sectional shape, and the angular distribution has high symmetry. Accordingly, the output light from the light emitter may be converted into parallel light relatively easily and an optical switch (light modulation device) may be illuminated with light having a nearly uniform intensity distribution.

However, in the configuration of International Publication WO 99/49358, if the semiconductor lasers are simply replaced with SLDs, the angular distributions of the output light are very different due to the difference in the gain region structure between the semiconductor lasers and the SLDs as described above, and thus, it is difficult to obtain a desired illumination condition.

SUMMARY

An advantage of some aspects of the invention is to provide an illumination device that may improve the symmetry of illumination light in a light source using SLDs. Another advantage of some aspects of the invention is to provide a projector having the illumination device.

An illumination device according to an aspect of the invention includes a light source including plural light emitting devices arranged in a pattern and that generate and guide light, the light emitting devices have tilted gain regions in which guiding directions of the light are tilted with respect to a perpendicular of output surfaces of the light source, an optical axis conversion device that bends optical axes of the light output from the light source, and a light distribution control device that controls a light distribution angle of the light output from the optical axis conversion device, wherein the light emitting devices are super luminescent diodes, and the light output from the light distribution control device diverge.

According to the illumination device, the light distribution angle of the light output from the optical axis conversion device may be controlled by the light distribution control device. Thereby, the light having an arched sectional shape like a crescent and an angular distribution with low symmetry generated by the tilted gain region may be converted into light having a nearly oval sectional shape and an angular distribution with high symmetry. Therefore, the symmetry of the illumination light that illuminates an illumination target may be improved.

Further, the light output from the light distribution control device may diverge. Accordingly, the light output from the respective plural output surfaces may partially overlap at least with the light output from the adjacent output surfaces on the illumination target. Thereby, for example, as compared to the case where the illumination target is illuminated by light output from the adjacent output surfaces that does not even partially overlap with each other, the illumination target may be illuminated with uniform intensity (illuminance distribution).

The illumination device according to the aspect of the invention may further include a diffusion device that diffuses the light output from the light distribution control device.

According to such an illumination device, intensity distributions of the light output from the respective output surfaces may be made (nearly) uniform, and illumination light with less illuminance irregularities may be obtained.

The illumination device according to the aspect of the invention may further include a light guide that guides the light output from the diffusion device to the illumination target.

According to such an illumination device, more light may illuminate the illumination target. Accordingly, the illumination efficiency may be improved without significant reduction of illumination uniformity.

In the illumination device according to the aspect of the invention, the optical axis conversion device and the light distribution control device may be integrally formed.

According to such an illumination device, light loss at the interface between the optical axis conversion device and the light distribution control device may be reduced. Further, the cost may be reduced.

In the illumination device according to the aspect of the invention, the light emitting device may have a plurality of the tilted gain regions, the guiding direction of the light of a first tilted gain region of the plurality of the tilted gain regions may be tilted to one side (e.g., in a first direction) with respect to the perpendicular of the output surfaces, and the guiding direction of the light of a second tilted gain region of the plurality of the tilted gain regions may be tilted to the other side (e.g., in a second (different) direction) with respect to the perpendicular of the output surface.

According to such an illumination device, the symmetry seen as the entire illumination light may be further improved.

In the illumination device according to the aspect of the invention, the light source may include a first light emitting device having a first tilted gain region in which the guiding direction of the light is tilted to one side (e.g., in a first direction) with respect to the perpendicular of the output surface, and a second light emitting device having a second tilted gain region in which the guiding direction of the light is tilted to the other side (e.g., in a second (different) direction) with respect to the perpendicular of the output surface.

According to such an illumination device, the symmetry seen as the entire illumination light may be further improved.

A projector according to another aspect of the invention includes an illumination device, a light modulation device that modulates light output from the illumination device in response to image information, and a projection device that projects an image formed by the light modulation device, and the illumination device includes a light source including plural light emitting devices arranged in a predetermined pattern and that generate and guide light, the light emitting devices having tilted gain regions in which guiding directions of the light are tilted with respect to a perpendicular of output surfaces of the light source, an optical axis conversion device that bends optical axes of the light output from the light source, and a light distribution control device that controls a light distribution angle of the light output from the optical axis conversion device, wherein the light emitting devices are super luminescent diodes, and the light output from the light distribution control device diverge.

According to the projector, since the illumination device having high symmetry of illumination light is provided, higher image quality of a projection image may be realized.

In the projector according to the aspect of the invention, a light distribution angle of the light controlled by the light distribution control device may be an angle projectable by the projection device.

According to such a projector, since the illumination device according to the aspect of the invention is provided, higher image quality of a projection image may be realized.

BRIEF DESCRIPTION OF THE DRAWINGS

The invention will be described with reference to the accompanying drawings, wherein like numbers reference like elements.

FIG. 2 schematically shows a light source of the illumination device according to the embodiment.

DESCRIPTION OF EXEMPLARY EMBODIMENTS

A preferred embodiment of the invention will be explained below with reference to the drawings.

1. Illumination Device

Figure 1:
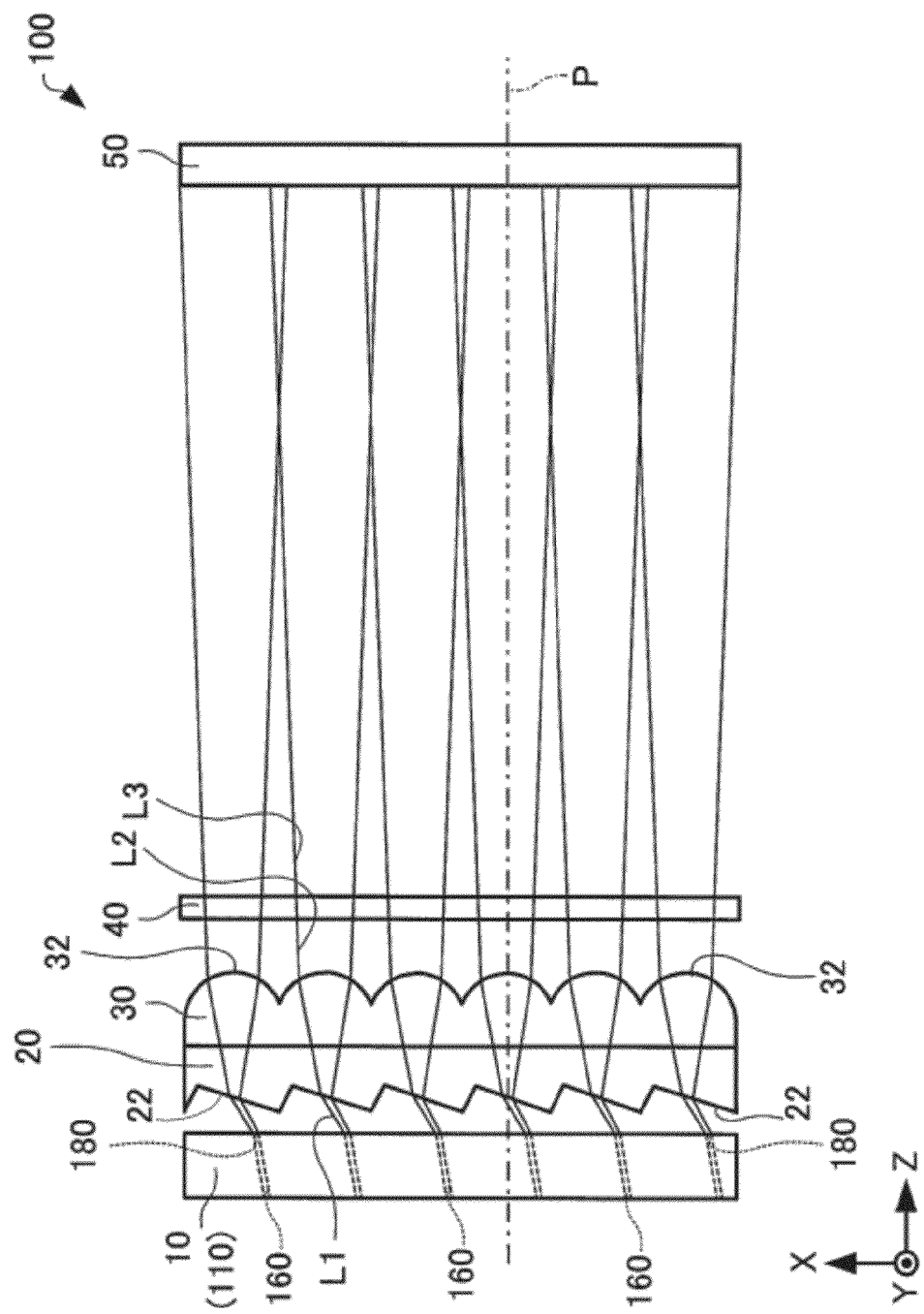
FIG. 1 schematically shows an illumination device according to an embodiment.

First, a light emitting device according to an embodiment will be explained with reference to the drawings. FIG. 1 schematically shows an illumination device 100 according to the embodiment. FIG. 2 schematically shows a light source 10 of the illumination device 100 according to the embodiment as seen from an output surface 180 side, which will be described later. Note that, in FIG. 1, for convenience, a light emitting device 110 forming the light source 10 will be simplified for ease of illustration.

As shown in FIG. 1, the illumination device 100 includes the light source 10, an optical axis conversion device 20, and a light distribution control device 30. Further, the illumination device 100 may include a diffusion device 40.

The light source 10 may output light. The light source 10 may include the light emitting device 110 and a support substrate 12 as shown in FIG. 2.

As shown in FIG. 2, a plurality of the light emitting devices 110 are provided, and they are arranged at equal intervals along the Y-axis direction. In the illustrated embodiment, six of the light emitting devices 110 are provided, however, the number is not particularly limited.

Each light emitting device 110 has plural tilted gain regions 160 as shown in FIG. 1. That is, the plural tilted gain regions 160 are formed on the same substrate. Thereby, the alignment of the light source 10 with the optical axis conversion device 20, the light distribution control device 30, and other elements becomes easier and control of the light distribution properties of the illumination light illuminating an illumination target 50 becomes easier. The plural tilted gain regions 160 are provided in parallel to one another, for example. In the example shown in FIG. 1, six of the tilted gain regions 160 are provided, however, the number is not particularly limited. The tilted gain regions 160 are arranged at equal intervals along the X-axis direction, for example, in one light emitting device 110. Each tilted gain region 160 has an output surface 180 that outputs light. The output surfaces 180 are arranged at equal intervals Dx along the X-axis direction as shown in FIG. 2.

As stated above, the light source 10 includes plural light emitting devices 110 arranged in the Y-axis direction as shown in FIG. 2. The output surfaces 180 are arranged at equal intervals Dy along the Y-axis direction. For example, in the example shown in FIG. 2, the output surfaces 180 are arranged at equal intervals (Dx=Dy) in a matrix (in a two-dimensional array) in the XY plane.

Figure 3:
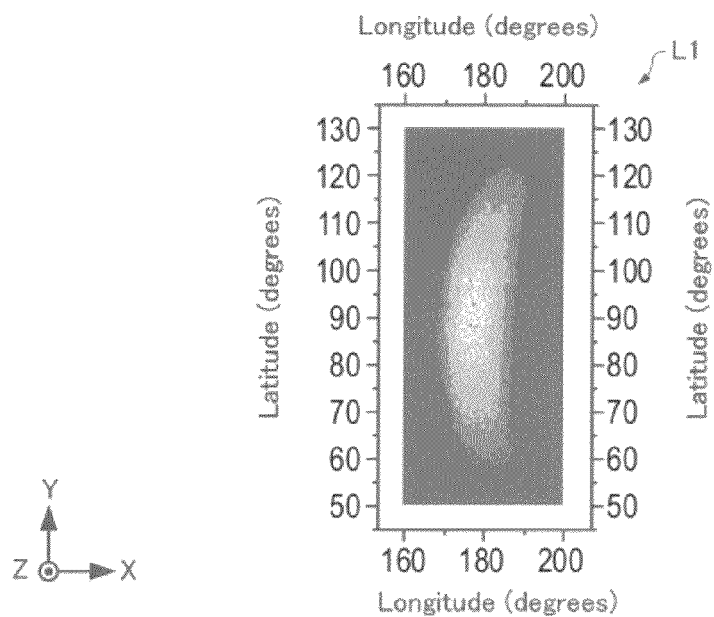
FIG. 3 schematically shows an angular distribution of light output from the light source of the illumination device according to the embodiment.

FIG. 3 schematically shows an angular distribution of light L1 output from the light emitting device 110 (from the tilted gain region 160). The tilted gain region 160 is tilted with respect to the perpendicular of the output surface 180 as shown in FIG. 1. Accordingly, the light L1 output from the tilted gain region 160 has an arched angular distribution similar to a crescent shape as shown in FIG. 3. In the illustrated example, the light distribution angle in the X-axis direction is about ±10° and the light distribution angle in the Y-axis direction is about ±35°, and the angular distribution spreads greatly in the Y-axis direction as compared to that in the X-axis direction. As described above, since the angular distribution of the light L1 output from the light emitting device 110 has an arched shape like a crescent, the sectional shape of the luminous flux is also arched like a crescent (in the downstream position slightly spaced apart from the light emitting device 110). The detailed configuration of the light emitting device 110 will be described later.

Each support substrate 12 supports a light emitting device 110 as shown in FIG. 2. A plurality of the support substrates 12 are provided for the light emitting devices 110. The material of the support substrate 12 is not particularly limited, and copper or aluminum may be used, for example.

As shown in FIG. 1, the light output from the light source 10 enters the optical axis conversion device 20. The optical axis of the light output from the light emitting device 110 is tilted to a greater extent than the tilt angle of the tilted gain region 160 (with respect to the perpendicular of the output surface 180) due to a difference in refractive index between the light emitting device 110 and the air. That is, the optical axis of the light output from the light emitting device 110 is tilted with respect to an illumination optical axis P (also referred to as "the perpendicular of the illuminated surface of the illumination target 50"). The optical axis conversion device 20 may bring the optical axis of the light tilted with respect to the illumination optical axis P (nearly) in parallel to the illumination optical axis P. That is, the light output from the optical axis conversion device 20 may have an optical axis (nearly) in parallel to the illumination optical axis P.

As the optical axis conversion device 20, a prism having slopes 22 forming predetermined angles with respect to the illumination optical axis P arranged to correspond to the output surfaces 180 in an array may be used. In the illustrated example, the optical axis conversion device 20 has six slopes 22 corresponding to the six output surfaces 180. The slope 22 may be a flat surface. The tilt angle of the slope 22 with respect to the illumination optical axis P is determined by a refractive index of a material forming the prism and the tilt angle of the optical axis (with respect to the illumination optical axis P) of the light entering the optical axis conversion device 20.

Note that, as the optical axis conversion device 20, a holographic optical device may be used, or a combination of a prism and a holographic optical device may be used, for example.

Figure 4:
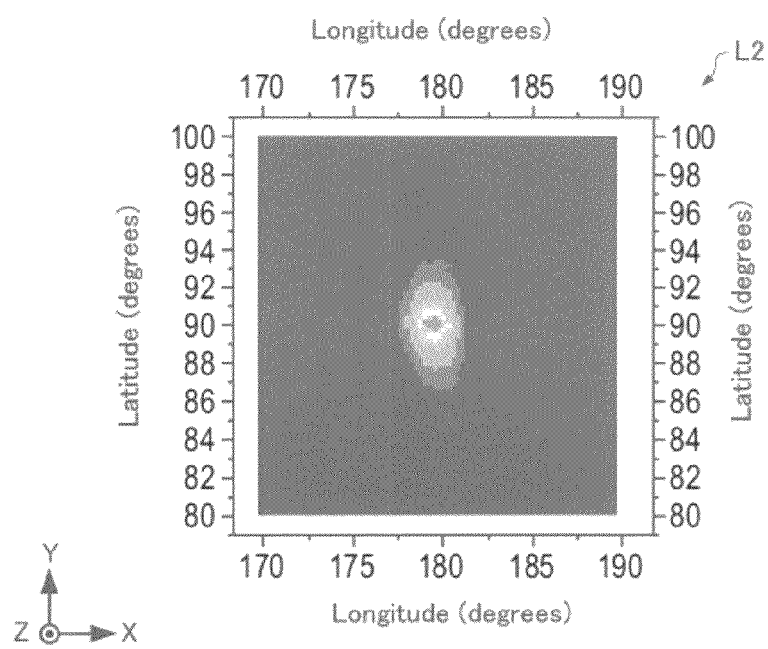
FIG. 4 schematically shows an angular distribution of light output from a light distribution control device of the illumination device according to the embodiment.

The light output from the optical axis conversion device 20 enters the light distribution control device 30. The light distribution control device 30 converts the angular distribution of the output light into predetermined values and the asymmetry in the angular distribution may be improved and brought closer to a symmetric angular distribution. FIG. 4 schematically shows an angular distribution of light L2 output from the light distribution control device 30 (showing output light from one light emitting device 110). As can be seen in FIGS. 3 and 4, for example, the light distribution angle in the X-axis direction becomes narrower from about ±10° before incidence to the light distribution control device 30 to about ±2° after incidence and the light distribution angle in the Y-axis direction becomes narrower from about ±35° before incidence to the light distribution control device 30 to about ±4° after incidence, and the asymmetry in the angular distribution is improved at the same time. As a result of the improvement of the asymmetry in the angular distribution, the sectional shape of the light L2 output from the light distribution control device 30 becomes an oval shape with high symmetry from the arched shape similar to a crescent.

Figure 5:
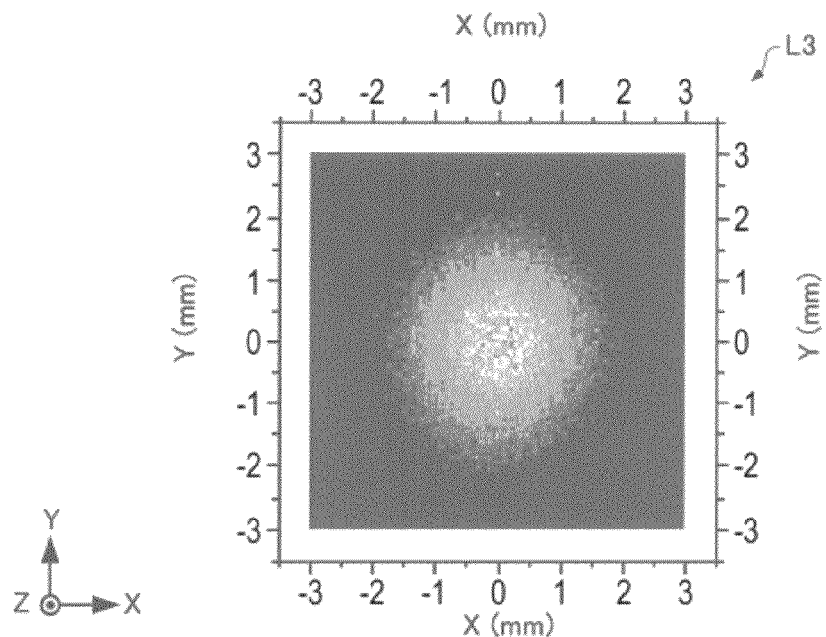
FIG. 5 schematically shows a sectional shape of light output from a diffusion device of the illumination device according to the embodiment.
Figure 6:
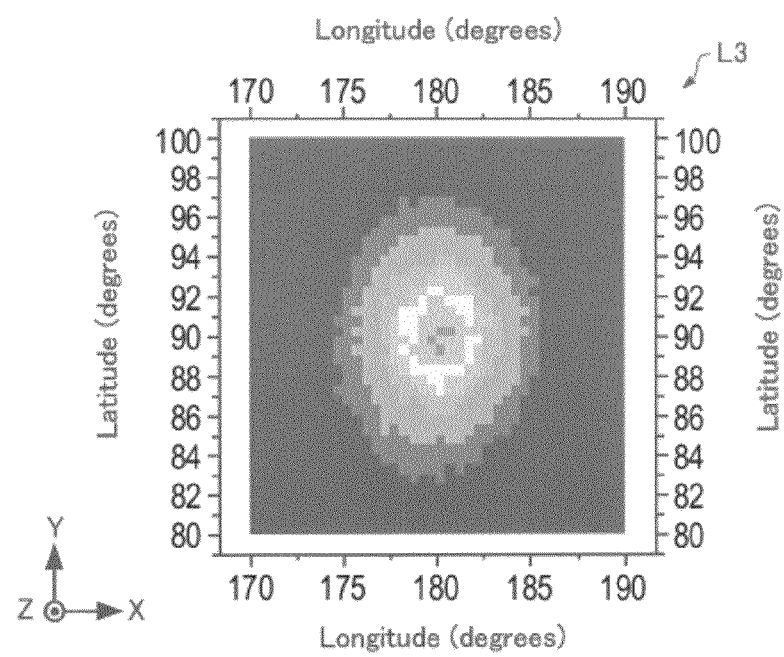
FIG. 6 schematically shows an angular distribution of the light output from the diffusion device of the illumination device according to the embodiment.

The light output from the light distribution control device 30 enters the diffusion device 40. The diffusion device 40 diffuses the light output from the respective plural output surfaces 180, and thereby, may further improve the symmetry of the sectional shape of each light and make the light intensity distribution (illuminance distribution) of the entire illumination light on the illumination target 50 (nearly) uniform. As the diffusion device 40, for example, a diffusion plate, a holographic optical device, a lens array, or a combination of these may be used. In the illustrated example, a diffusion plate is used as the diffusion device 40. FIG. 5 schematically shows a sectional shape of light L3 output from the diffusion device 40 (showing output light from one light emitting device 110), and FIG. 6 schematically shows an angular distribution of the light L3 output from the diffusion device 40. As can be seen in FIGS. 5 and 6, the sectional shape is an oval shape close to a circular shape, and the angular distribution has high symmetry close to a circular shape.

As the light distribution control device 30, a lens array including lenses 32 having collecting action in an array may be used as shown in FIG. 1. In the illustrated example, the plural lenses 32 are provided to correspond to the output surfaces 180 of the light source 10. As the lens 32, a spherical lens, an aspherical lens having an axis of symmetry, a toric lens having different radii of curvature in the X-axis direction and the Y-axis direction, a free-form surface lens having no axis of symmetry, a Fresnel lens having a discontinuous curved surface, or the like may be used. In the case of the SLD, the radiation angles of light output from the light emitting device are often different in the X-axis direction and the Y-axis direction in FIG. 1. Therefore, in the case where the aspherical lens, the toric lens, the free-form surface lens, or the like is used as the lens 32, the direction of the light output from the light distribution control device 30 may be independently controlled with respect to the X-axis direction and the Y-axis direction and the light distribution of the light L2 output from the light distribution control device 30 may be finely controlled, and thus, the sectional shape may be brought close to a circular shape having high symmetry. However, the spherical lens is easily employed in respect of costs.

Note that, as the light distribution control device 30, a holographic optical device may be used, or a combination of a prism and a holographic optical device may be used, for example.

As shown in FIG. 1, with the light distribution control device 30 and the diffusion device 40, the light output from the respective plural output surfaces 180 may diverge to partially overlap at least with the light output from the adjacent output surfaces 180 on the illumination target 50. Therefore, for example, as compared to the case where the illumination target is illuminated by the light output from the adjacent plural output surfaces 180 but not partially overlapping with each other, the illumination target may be illuminated with uniform intensity (illuminance distribution). In the case of illumination using light not partially overlapping on the illumination target, the illumination intensity is significantly lower at the boundaries between adjacent light, and a non-uniform illuminance distribution is often formed.

In the case where the illumination device 100 is used for a projector, the light distribution angle of the light output from the diffusion device 40 (may be referred to as "tilt angle", or "diverging angle" with respect to the illumination optical axis P) is set to an angle at which the illumination target (the light modulation device for the projector) can receive light or an angle at which projection can be performed in the projection system (projection device). In the case of a typical projector, given that the maximum reception angle of the light modulation device and the maximum projectable angle are about 20°, it is desirable that the light distribution angle (angular distribution range) of the light output from the diffusion device 40 is set in a range from more than 0° to equal to or less than 20°.

In the illustrated example, the light output from the respective plural output surfaces 180 overlap with the light output from the next output surfaces 180 on the illumination target 50, however, the light may overlap with the light output from other output surfaces 180. For example, from the output surfaces 180 next to the next. Note that the light output from the respective plural output surfaces 180 do not completely overlap. Therefore, by controlling light intensity of output light with respect to each tilted gain region 160, local regions on the illumination target 50 may be independently illuminated with arbitrary light intensity. Especially, in the case where a light modulation device such as a liquid crystal light valve is illuminated, light intensity modulation by the illumination device and light intensity modulation by the light modulation device are simultaneously performed, and thereby, both high brightness and high contrast may be realized and higher image quality of displayed images may be realized.

Note that, in the description of the embodiment of the invention, for example, overlapping of light A and light B on the illumination target means overlapping of illumination region of the light A and the illumination region of the light B on the illumination target, and the illumination regions of the light A and the light B mean regions having an intensity equal to or more than 10% relative to the intensity at the center of the light.

In the example shown in FIG. 1, the optical axis conversion device 20 and the light distribution control device 30 are formed in contact with each other, however, they may be formed apart. Alternatively, the optical axis conversion device 20 and the light distribution control device 30 may be integrally formed. For example, the optical axis conversion device 20 may be obtained by forming plural slopes 22 on one surface of one glass substrate and the light distribution control device 30 may be obtained by forming plural lenses 32 on the other surface (the opposite surface to the one surface). Thereby, light loss at the interface between the optical axis conversion device 20 and the light distribution control device 30 may be reduced. Further, the cost may be reduced.

The diffusion device 40 is provided in a position apart from the light distribution control device 30, however, the device 40 may be integrated with the light distribution control device 30 for reduction of light loss at the interface. For example, in the case where the light distribution control device 30 includes a lens array, the diffusion device 40 may be formed on the surface of the lens array for integrated configuration.

The light output from the diffusion device 40 illuminates the illumination target 50. As the illumination target 50, although not particularly limited, a liquid crystal light valve (light modulation device) may be cited in the case where the illumination device 100 is used for a projector.

Figure 7:
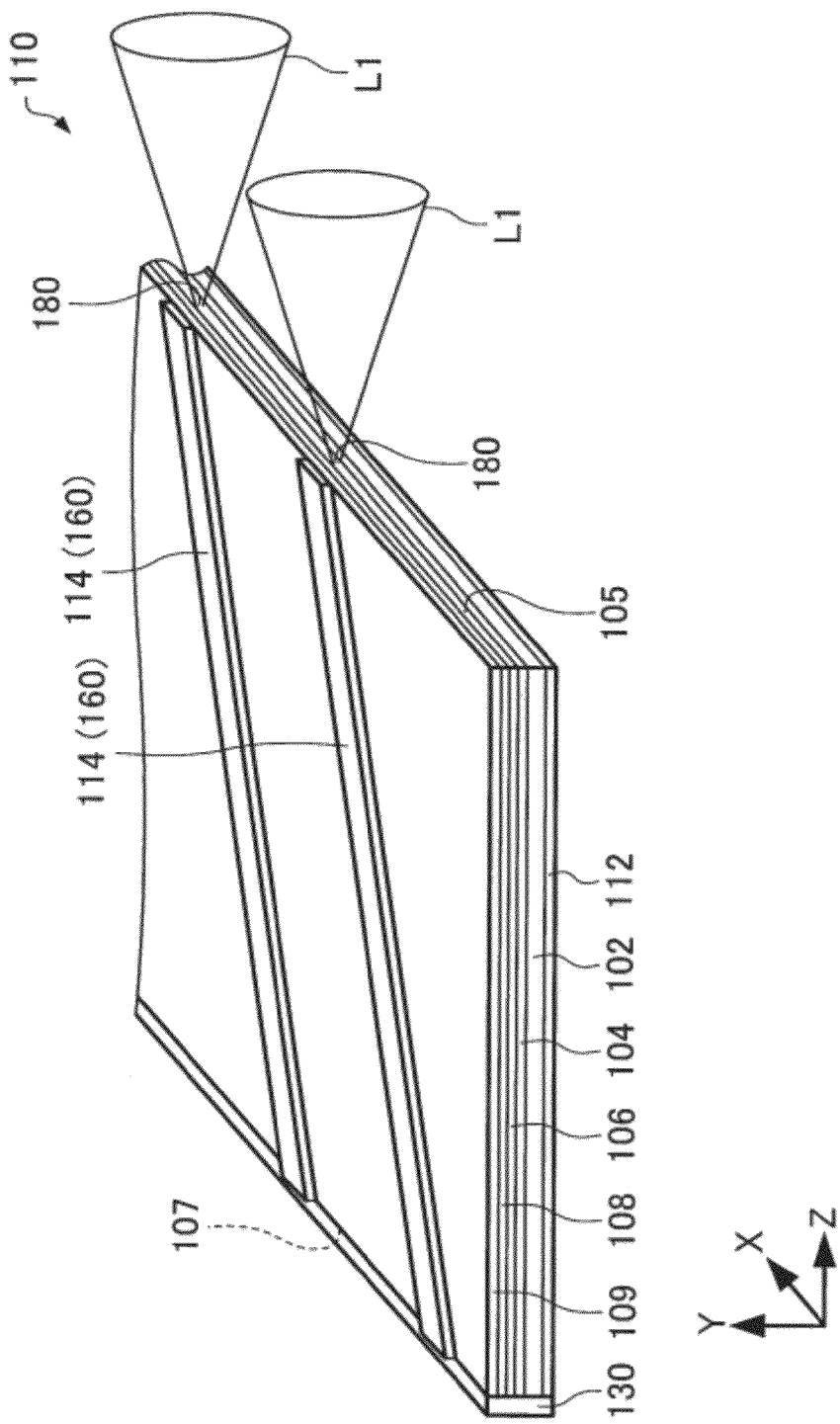
FIG. 7 is a perspective view schematically showing a light emitting device of the illumination device according to the embodiment.
Figure 8:
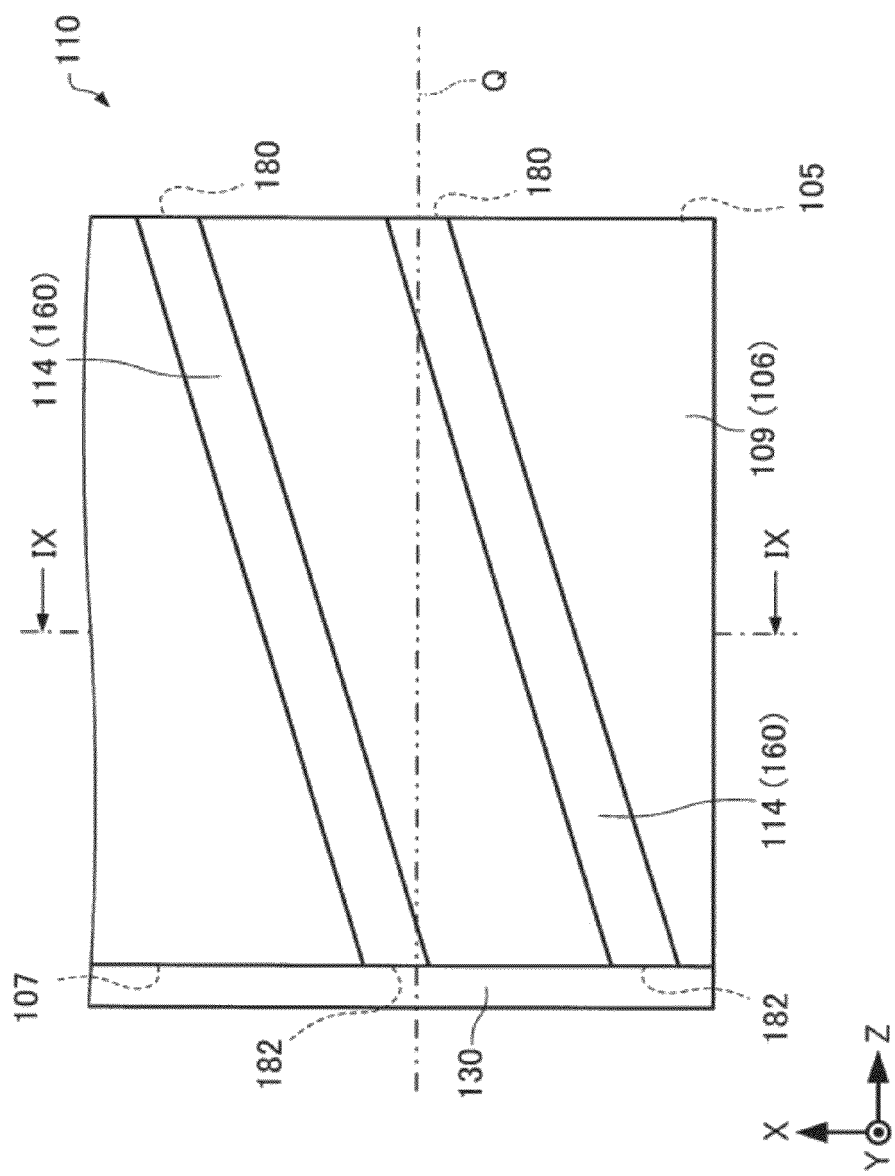
FIG. 8 is a plan view schematically showing the light emitting device of the illumination device according to the embodiment.
Figure 9:
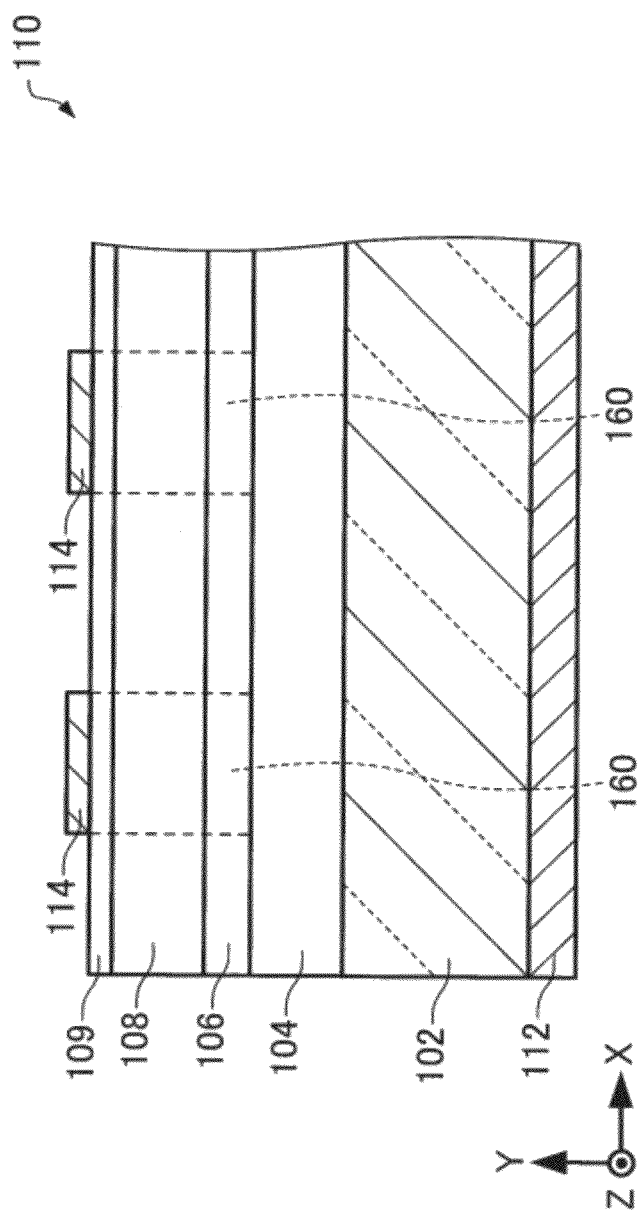
FIG. 9 is a sectional view schematically showing the light emitting device of the illumination device according to the embodiment.

Next, the detailed configuration of the light emitting device 110 will be explained. FIG. 7 is a perspective view schematically showing the light emitting device 110 according to the embodiment. FIG. 8 is a plan view schematically showing the light emitting device 110 according to the embodiment. FIG. 9 is a sectional view schematically showing the light emitting device 110 according to the embodiment along IX-IX line in FIG. 8. Note that, in FIGS. 7 to 9, for convenience, two tilted gain regions 160 are shown.

Below, a case where the light emitting device 110 is an SLD that emits red light of an InGaAlP system will be explained. Unlike a semiconductor laser, the SLD can prevent laser oscillation by suppressing the formation of a resonator due to edge reflection. Accordingly, speckle noise may be reduced.

As shown in FIGS. 7 to 9, the light emitting device 110 includes a substrate 102, a first cladding layer 104, an active layer 106, a second cladding layer 108, a contact layer 109, a first electrode 112, a second electrode 114, and a reflection film 130.

As the substrate 102, for example, a first conductivity-type (for example, n-type) GaAs substrate or the like may be used.

The first cladding layer 104 is formed on the substrate 102. As the first cladding layer 104, for example, an n-type InGaAlp layer or the like may be used.

The active layer 106 is formed on the first cladding layer 104. The active layer 106 has a multiple quantum well (MQW) structure in which three quantum well structures each including an InGaP well layer and an InGaAlP barrier layer, for example, are stacked.

The shape of the active layer 106 is a rectangular parallelepiped (including the case of a cube), for example. The active layer 106 may have a first side surface 105 and a second side surface 107 as shown in FIGS. 7 and 8. The first side surface 105 and the second side surface 107 are opposed to each other, and in parallel in the illustrated example.

Parts of the active layer 106 form the tilted gain regions 160 that may serve as current channels. In the tilted gain region 160, light may be generated and the light may be amplified within the tilted gain regions 160. The tilted gain region 160 may be referred to as "light propagation region (waveguide region)". The planar shape of the tilted gain region 160 seen from the stacking direction of the light emitting device 110 is a parallelogram, for example.

In a wavelength band of light generated in the tilted gain region 160, for example, reflectance of the second side surface 107 is higher than reflectance of the first side surface 105. For example, by covering the second side surface 107 with the reflection film 130, higher reflectance may be obtained. The reflection film 130 is a dielectric multilayer mirror, for example. Specifically, as the reflection film 130, a mirror in which four pairs of an $Al_2O_3$ layer and a $TiO_2$ layer are stacked from the second side surface 107 side in this order may be used. It is desirable that the reflectance of the second side surface 107 is just or nearly 100%. On the other hand, it is desirable that the reflectance of the first side surface 105 is just or nearly 0%. For example, by covering the first side surface 105 with an antireflection film (not shown), lower reflectance may be obtained. As the antireflection film, an $Al_2O_3$ single layer may be used, for example.

The tilted gain regions 160 are provided so that the extension direction from the first side surface 105 to the second side surface 107 (guiding direction of light) may be tilted with respect to a perpendicular line Q of the first side surface 105 in the plan view (seen from the Y-axis direction) as shown in FIG. 8. Thereby, laser oscillation of the light generated in the tilted gain regions 160 may be suppressed or prevented. As shown in FIGS. 1 and 8, the plural tilted gain regions 160 are provided at tilts in the same direction with respect to the perpendicular line Q.

The tilted gain region 160 may have a first end surface 180 provided on the first side surface 105 and a second end surface 182 provided on the second side surface 107 as shown in FIG. 8. Accordingly, in the wavelength band of light generated in the tilted gain region 160, reflectance of the first end surface 180 is just or nearly 0%, for example, and reflectance of the second end surface 182 is just or nearly 100%, for example. Therefore, the first end surface 180 is an output surface that outputs light generated in the tilted gain region 160 (corresponding to the output surface 180 in FIG. 1), and the second end surface 182 is a reflection surface that reflects the light generated in the tilted gain region 160. That is, the first side surface 105 may have plural output surfaces 180 (first end surfaces 180) and the perpendicular line Q of the first side surface 105 is also the perpendicular line Q of the output surfaces 180.

The second cladding layer 108 is formed on the active layer 106 as shown in FIGS. 7 and 9. As the second cladding layer 108, a second conductivity-type (for example, p-type) AlGaInP layer or the like may be used.

For example, the p-type second cladding layer 108, the active layer 106 not doped with impurity, and the n-type first cladding layer 104 form a pin diode. Each of the first cladding layer 104 and the second cladding layer 108 is a layer having a larger forbidden band width and a lower refractive index than those of the active layer 106. The active layer 106 has a function of generating and guiding light and amplifying the light by injecting carriers (electrons and holes). The first cladding layer 104 and the second cladding layer 108 sandwich the active layer 106 and have a function of confining injected carriers (electrons and holes) and light.

In the light emitting device 110, when a forward bias voltage of the pin diode is applied between the first electrode 112 and the second electrode 114, recombination of electrons and holes occurs in the tilted gain region 160 of the active layer 106. Light is emitted by the recombination. Starting from the generated light, chained stimulated emission occurs and the intensity of the light is amplified within the tilted gain region 160. Then, the light with amplified intensity is output from the output surface 180 of the tilted gain region 160 as light L1 as shown in FIG. 7.

The contact layer 109 is formed on the second cladding layer 108 as shown in FIGS. 7 and 9. As the contact layer 109, a layer in ohmic contact with the second electrode 114 may be used. As the contact layer 109, for example, a p-type GaAs layer may be used.

The first electrode 112 is formed on the entire surface under the substrate 102. The first electrode 112 may be in contact with a layer (the substrate 102 in the illustrated example) in ohmic contact with the first electrode 112. The first electrode 112 is electrically connected to the first cladding layer 104 via the substrate 102. The first electrode 112 is one electrode for driving the light emitting device 110. As the first electrode 112, for example, an electrode formed by stacking a Cr layer, an AuGe layer, an Ni layer, and an Au layer in this order from the substrate 102 side may be used.

The second electrode 114 is formed on the contact layer 109. The second electrode 114 is electrically connected to the second cladding layer 108 via the contact layer 109. The second electrode 114 is the other electrode for driving the light emitting device 110. As the second electrode 114, for example, an electrode formed by stacking a Cr layer, an AuZn layer, and an Au layer in this order from the contact layer 109 side may be used. The lower surface of the second electrode 114 (the contact surface between the second electrode 114 and the contact layer 109) may have the same planar shape as that of the tilted gain region 160. By the planar shape of the contact surface between the second electrode 114 and the contact layer 109, current channels between the electrodes 112, 114 are determined and, as a result, the planar shape of the tilted gain region 160 may be determined.

In the above described example, a so-called gain-guiding type light emitting device 110 has been explained, however, for example, the light emitting device 110 may be of a refractive index-guiding type that confines light by patterning the contact layer 109 and the second cladding layer 108 to form columnar parts and providing refractive index differences between regions where the columnar parts are formed and regions the columnar parts are not formed may be used.

So far, the case of the InGaAlP system has been explained as an example of the light emitting device 110 according to the embodiment, and any material system that can form an emission gain region may be used in the light emitting device 110. As a semiconductor material, for example, a semiconductor material of an AlGaN system, an InGaN system, a GaAs system, an AlGaAs system, an InGaAs system, an InGaAsP system, a ZnCdSe system, or the like may be used.

According to the illumination device 100 of the embodiment, for example, the following characteristics are provided.

According to the illumination device 100, the optical axis of the output light from the light emitting device 110 and the illumination optical axis P may be nearly aligned by the optical axis conversion device 20, and the light distribution angle (anglular distribution) of the illumination light may be controlled to a desired value by the light distribution control device 30 and the diffusion device 40. Thereby, the light having the arched sectional shape like a crescent and the angular distribution with low symmetry generated by the tilted gain region 160 may be converted into light having a nearly circular sectional shape and an angular distribution with high symmetry. Therefore, the illumination device 100 may improve the symmetry of the illumination light that illuminates the illumination target 50.

Further, the light output from the light distribution control device 30 and the diffusion device 40 may diverge. Accordingly, the light output from the respective plural output surfaces 180 may partially overlap at least with the light output from the adjacent output surfaces 180 on the illumination target 50. Thereby, in the illumination device 100, for example, as compared to the case where the illumination target is illuminated by light that does not even partially overlap, the illumination target may be illuminated with uniform intensity (illuminance distribution).

Note that, in the embodiment, the diffusion device 40 has been provided, however, depending on the properties (the sectional shape and the angular distribution) of the output light from the light emitting device 110, illumination light having desired properties may be obtained without using the diffusion device 40, and instead only using the light distribution control device 30.

2. Modified Examples of Illumination Device

2.1. First Modified Example

Figure 10:
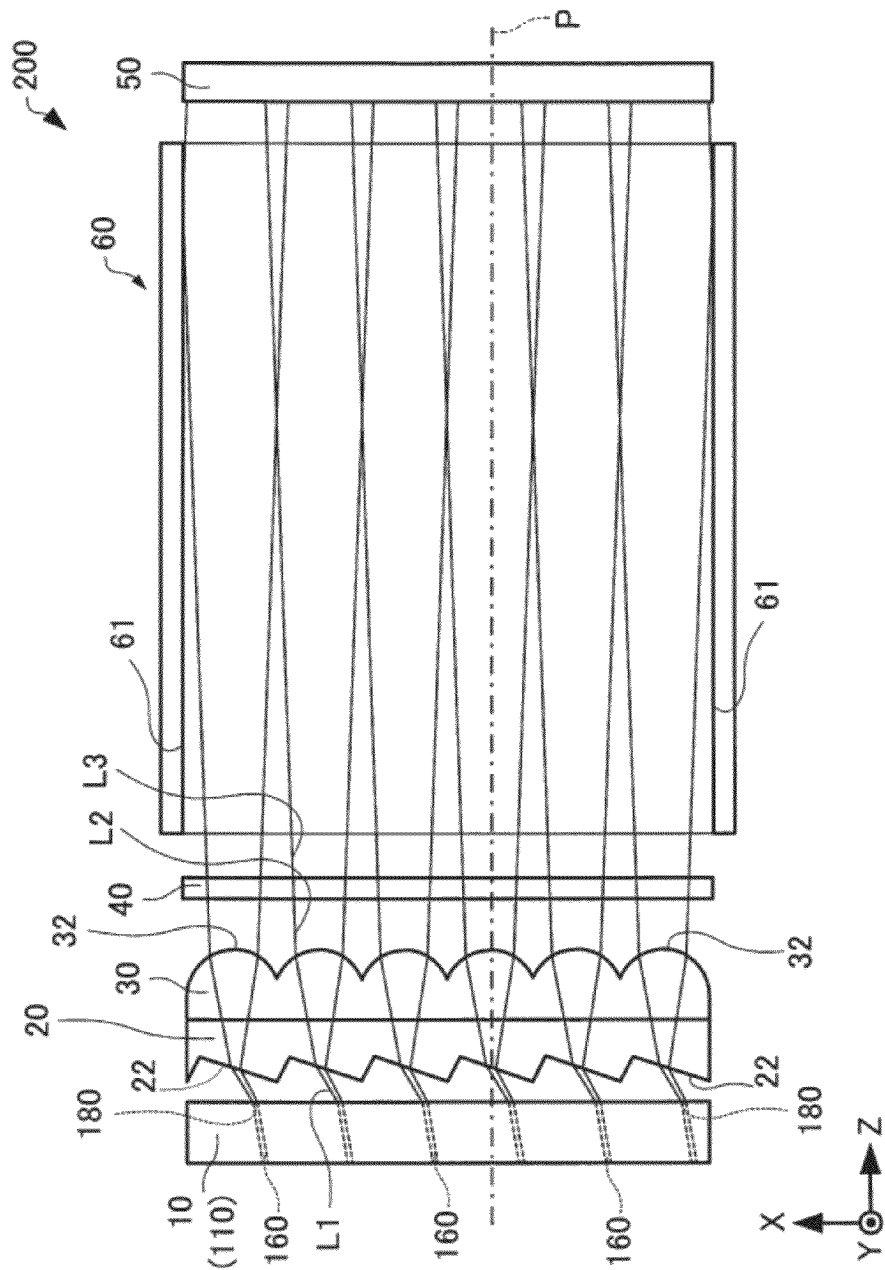
FIG. 10 schematically shows an illumination device according to a first modified example of the embodiment.

Next, an illumination device according to a first modified example of the embodiment will be explained with reference to the drawings. FIG. 10 schematically shows an illumination device 200 according to the first modified example of the embodiment.

In the illumination device 200 according to the first modified example of the embodiment, the same reference signs are assigned to members having the same functions as those of the component members of the illumination device 100 according to the embodiment, and a detailed explanation will be omitted. This applies to illumination devices 300, 400, 500, 600 according to second to fifth modified examples of the embodiment, which will be described later.

As shown in FIG. 10, the illumination device 200 includes a light guide 60. The light guide 60 may guide light output from the diffusion device 40 to the illumination target 50. The light guide 60 is provided between the diffusion device 40 and the illumination target 50. As the light guide 60, for example, one having a mirror body formed on the inner surface of a tubular member, a rod-shaped light transmissive medium, or the like may be used. In the light guide 60, reflection surfaces 61 are provided except in apart that the light output from the diffusion device 40 enters and a part that outputs the light from the light guide 60 to the illumination target 50. The reflection surface 61 may include a mirror body or may be formed by a total reflection surface.

As explained in the example of the illumination device 100, since the light to illuminate the illumination target 50 diverges as shown in FIG. 1, light that does not illuminate the illumination target 50 may be generated and the illumination efficiency may be lower. However, in the illumination device 200, as shown in FIG. 10, the light that would not illuminate the illumination target 50 without the light guide 60 may be reflected by the reflection surfaces 61 of the light guide 60 and thereafter illuminate the illumination target 50, and thus, more light may illuminate the illumination target 50. Accordingly, in the illumination device 200, the illumination efficiency may be improved without significant reduction of illumination uniformity.

Note that it is desirable that the sectional shape and the size (the shape and the size in the XY plane) of the light output edge of the light guide 60 are made nearly equal to the sectional shape and the size of the illumination target 50, however, the shape is not limited to these. For example, dimensions and shapes in which the sectional shape of the light output part of the light guide 60 is a similar shape with respect to the sectional shape of the illumination target 50 and the size of the light output part of the light guide 60 is slightly larger than the size of the illumination target 50 or slightly smaller or the like may be employed. That is, it is desirable that the sectional shape and the size of the light output edge of the light guide 60 are set in consideration of the light distribution angle (diverging angle) of the illumination light so that the illumination target 50 may be illuminated (nearly) uniformly.

2.2 Second Modified Example

Figure 11:
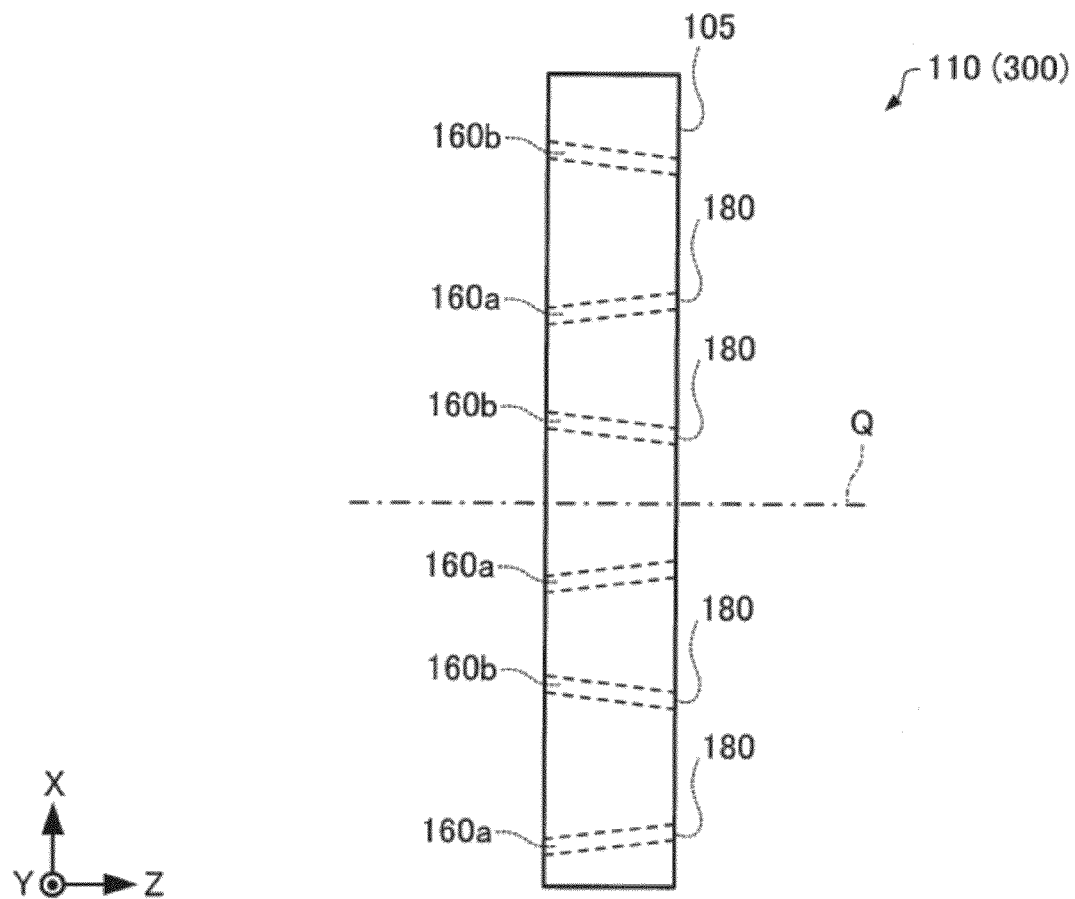
FIG. 11 is a plan view schematically showing a light emitting device of an illumination device according to a second modified example of the embodiment.

Next, an illumination device according to a second modified example of the embodiment will be explained with reference to the drawings. FIG. 11 is a plan view schematically showing a light emitting device 110 of an illumination device 300 according to the second modified example of the embodiment. In FIG. 11, for convenience, the light emitting device 110 is simplified for illustration.

In the example of the illumination device 100, as shown in FIGS. 1 and 8, the plural tilted gain regions 160 of the light emitting device 110 have been tilted toward the same side with respect to the perpendicular Q of the first side surface 105.

On the other hand, in the light emitting device 110 of the illumination device 300, as shown in FIG. 11, first tilted gain regions 160a of the plural tilted gain regions 160 are tilted toward one side with respect to the perpendicular Q and second tilted gain regions 160b of the plural tilted gain regions 160 are tilted toward the other side (different from the one side) with respect to the perpendicular Q. The first tilted gain regions 160a and the second tilted gain regions 160b may have shapes symmetric with respect to the perpendicular Q. In the illustrated example, the first tilted gain regions 160a and the second tilted gain regions 160b are provided in the same number and alternately arranged along the X-axis direction.

As has been explained in the example of the illumination device 100, the light L2 output from the light distribution control device 30 has improved symmetry in the angular distribution (symmetry of the sectional shape of light) as shown in FIG. 4, however, the sectional shape of the light L2 may not be completely formed in an oval shape. Accordingly, in the illumination device 300, as shown in FIG. 11, by changing the tilt directions of the plural tilted gain regions 160 and providing them as the first tilted gain regions 160a and the second tilted gain regions 160b, the symmetry in the angular distribution seen as the entire illumination light may be further improved.

2.3. Third Modified Example

Figure 12:
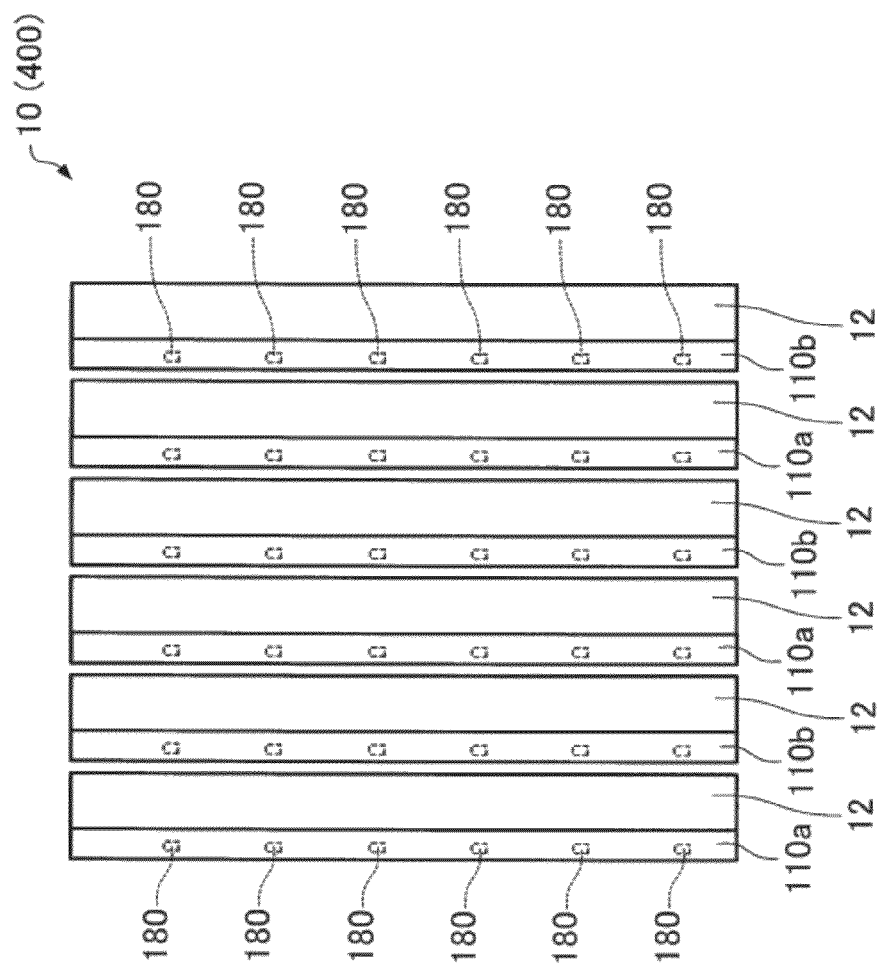
FIG. 12 schematically shows a light source of an illumination device according to a third modified example of the embodiment.
Figure 13:
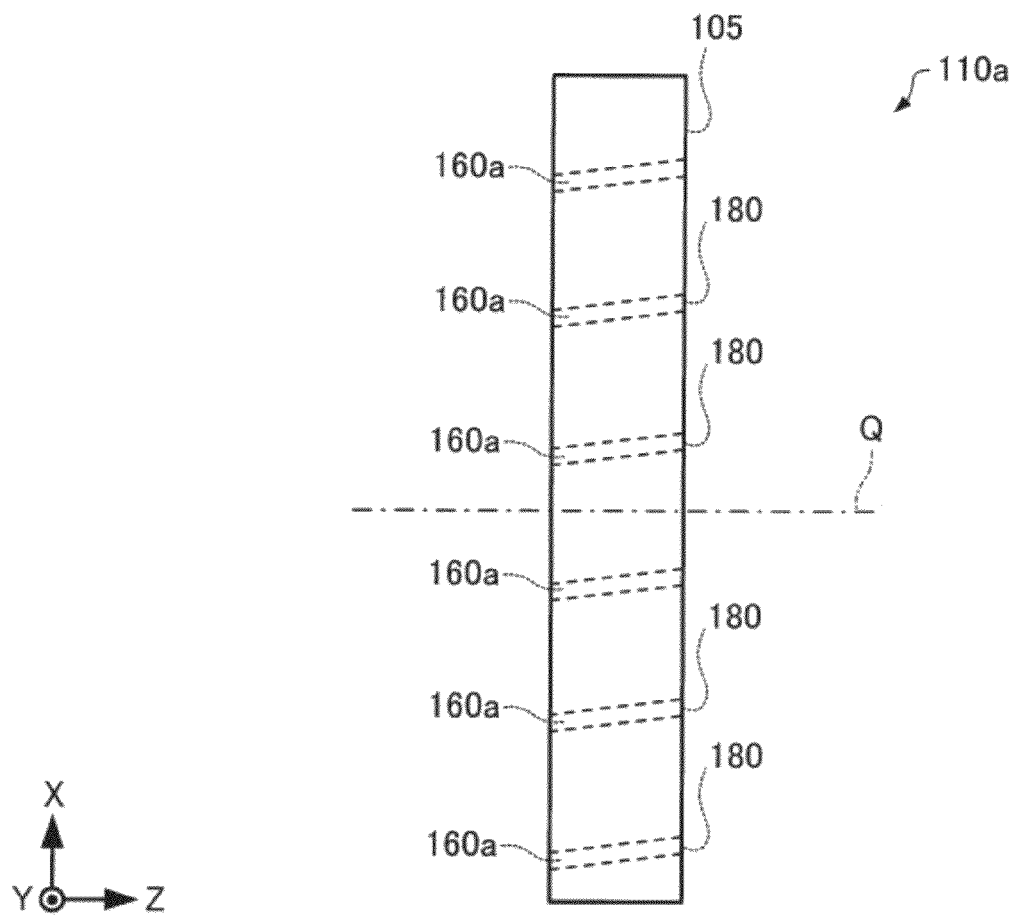
FIG. 13 is a plan view schematically showing a light emitting device of the illumination device according to the third modified example of the embodiment.
Figure 14:
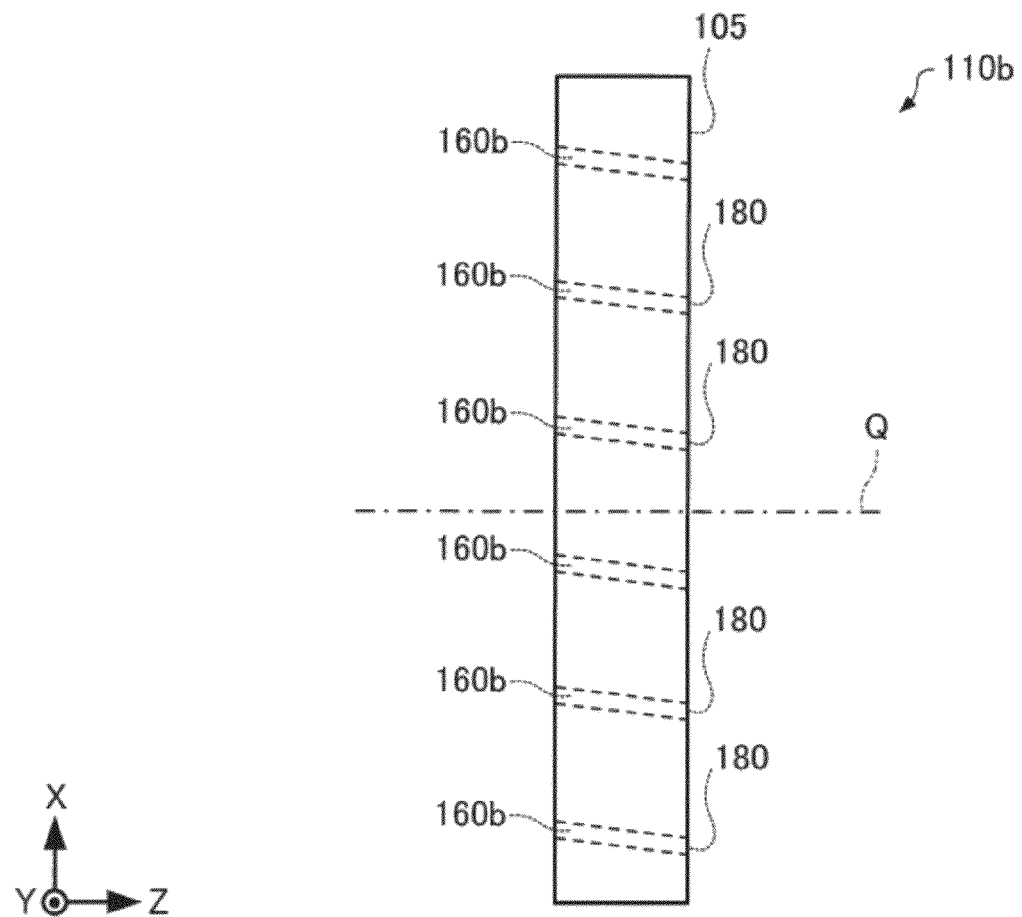
FIG. 14 is a plan view schematically showing the light emitting device of the illumination device according to the third modified example of the embodiment.

Next, an illumination device according to a third modified example of the embodiment will be explained with reference to the drawings. FIG. 12 schematically shows the light source 10 of an illumination device 400 according to the third modified example of the embodiment corresponding to FIG. 2. FIGS. 13 and 14 are plan views schematically showing the light emitting device 110 of the illumination device 400 according to the third modified example of the embodiment. Note that, in FIGS. 13 and 14, for convenience, the light emitting device 110 is simplified for illustration.

In the light source 10 of the illumination device 400, as shown in FIG. 12, first light emitting devices 110a and second light emitting devices 110b of the plural light emitting devices 110 are alternately arranged along the Y-axis direction. In the illustrated example, the first light emitting devices 110a and the second light emitting devices 110b are provided in the same number.

In the first light emitting device 110a, as shown in FIG. 13, the plural tilted gain regions 160 are the first tilted gain regions 160a tilted toward one side with respect to the perpendicular Q of the first side surface 105. On the other hand, in the second light emitting device 110b, as shown in FIG. 14, the plural tilted gain regions 160 are the second tilted gain regions 160b tilted toward the other side (different from the one side) with respect to the perpendicular Q. In the illustrated example, the number of first tilted gain regions 160a provided in the first light emitting device 110a and the number of second tilted gain regions 160b provided in the second light emitting device 110b are the same.

In the illumination device 400, like the illumination device 300, the symmetry in the angular distribution seen as the entire illumination light may be further improved as compared to the example of the illumination device 100.

2.4. Fourth Modified Example

Figure 15:
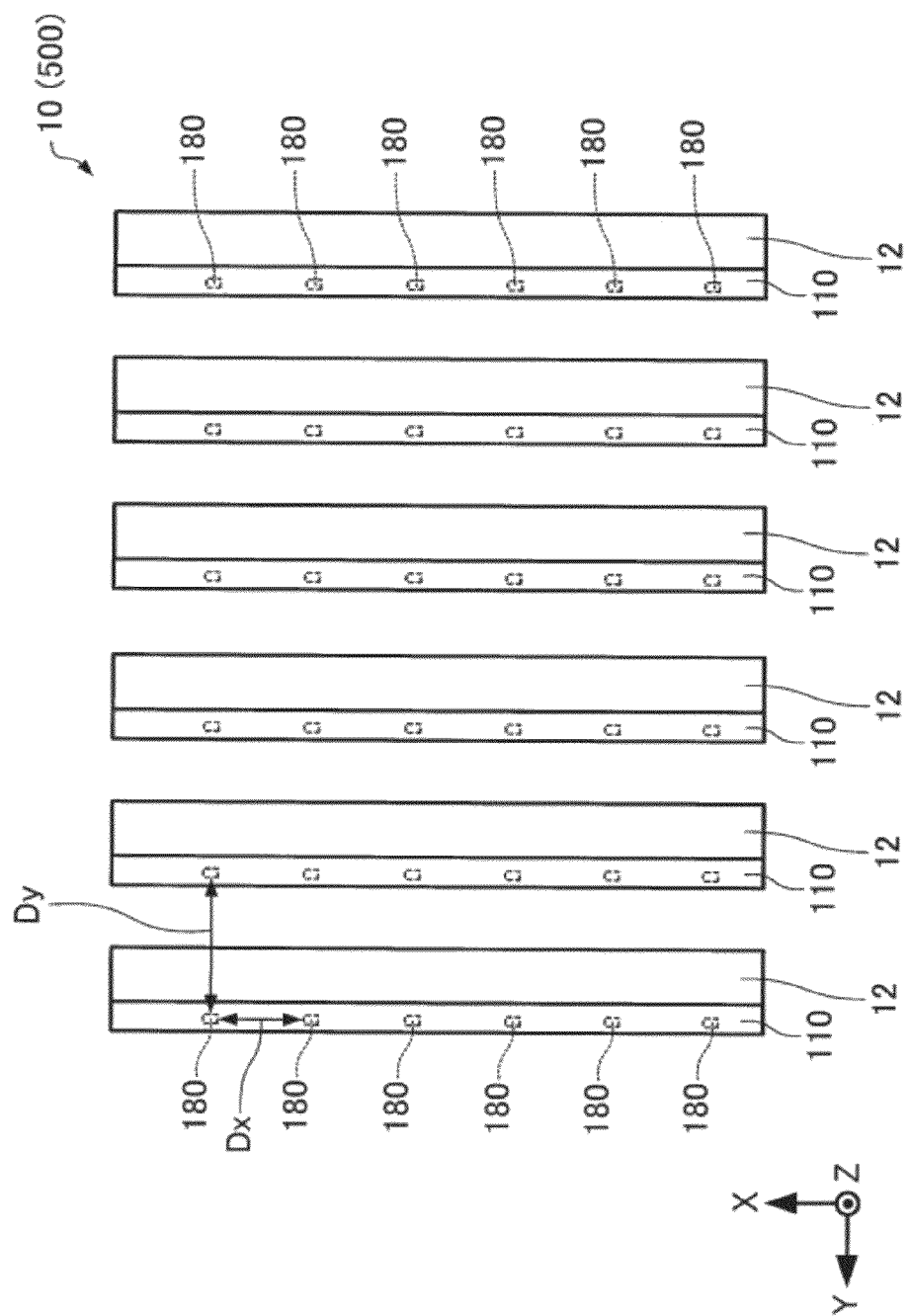
FIG. 15 schematically shows a light source of an illumination device according to a fourth modified example of the embodiment.

Next, an illumination device according to a fourth modified example of the embodiment will be explained with reference to the drawings. FIG. 15 schematically shows the light source 10 of an illumination device 500 according to the fourth modified example of the embodiment corresponding to FIG. 2.

In the example of the illumination device 100, as shown in FIG. 2, the output surfaces 180 of the light source 10 are arranged in a matrix at equal intervals in the XY plane.

On the other hand, in the light source 10 of the illumination device 500, as shown in FIG. 15, the plural output surfaces 180 are arranged so that the distance Dy between the adjacent output surfaces 180 in the Y-axis direction is larger than the distance Dx between the adjacent output surfaces 180 in the X-axis direction.

Figure 16:
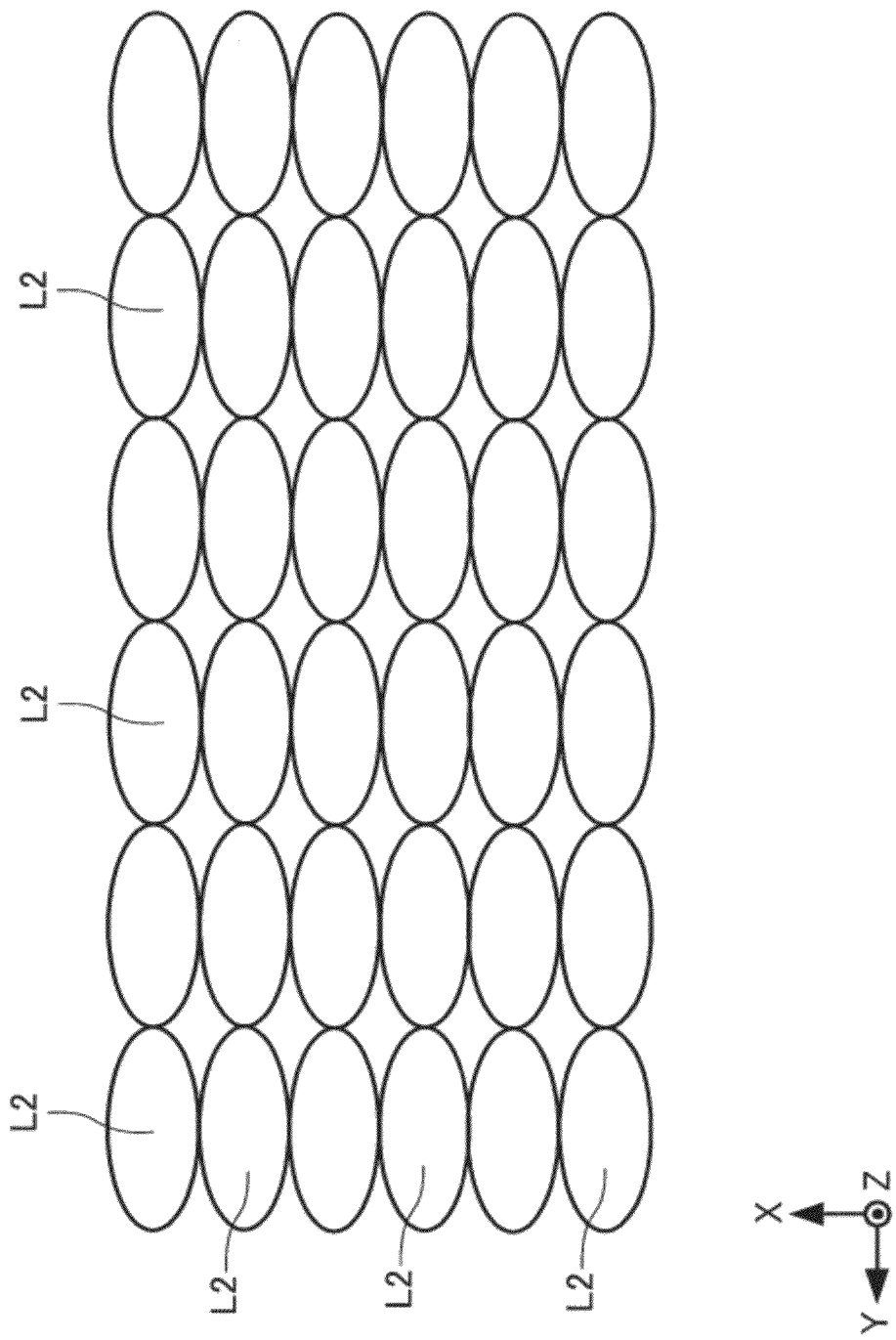
FIG. 16 schematically shows sectional shapes of light output from light distribution control devices of the illumination device according to the fourth modified example of the embodiment.

As has been explained in the example of the illumination device 100, the light L2 output from the light distribution control device 30 has improved symmetry in the angular distribution as shown in FIG. 4, however, the angular distribution is often different between the X-axis direction and the Y-axis direction. Accordingly, if the output surfaces 180 are arranged in the XY plane at equal intervals, the illuminance distribution of illumination light may not be uniform in the X-axis direction and the Y-axis direction. For example, in the example shown in FIG. 2, since the Y-axis direction is the stacking direction of the light emitting device 110, the confinement width of light within the light emitting device 110 in the Y-axis direction is smaller than the confinement width of light in the X-axis direction. Therefore, regarding the light L2, the light distribution angle in the Y-axis direction is larger than the light distribution angle in the X-axis direction. In the illumination device 500, by making the arrangement of the output surfaces 180 denser in the X-axis direction than that in the Y-axis direction, as shown in FIG. 16, the plural lights L2 may be made closer in the X-axis direction and the Y-axis direction. Alternatively, in the case where the adjacent lights L2 partially overlap, the degree of overlapping may be made closer in the X-axis direction and the Y-axis direction. Thereby, in the illumination device 500, the uniformity of the illuminance distribution of illumination light on the illumination target may be improved.

Note that, in FIG. 16, the sectional shapes of the light L2 output from the plural light distribution control devices 30 are schematically shown and the sectional shapes of the light L2 are illustrated as oval shapes for convenience.

2.5. Fifth Modified Example

Figure 17:
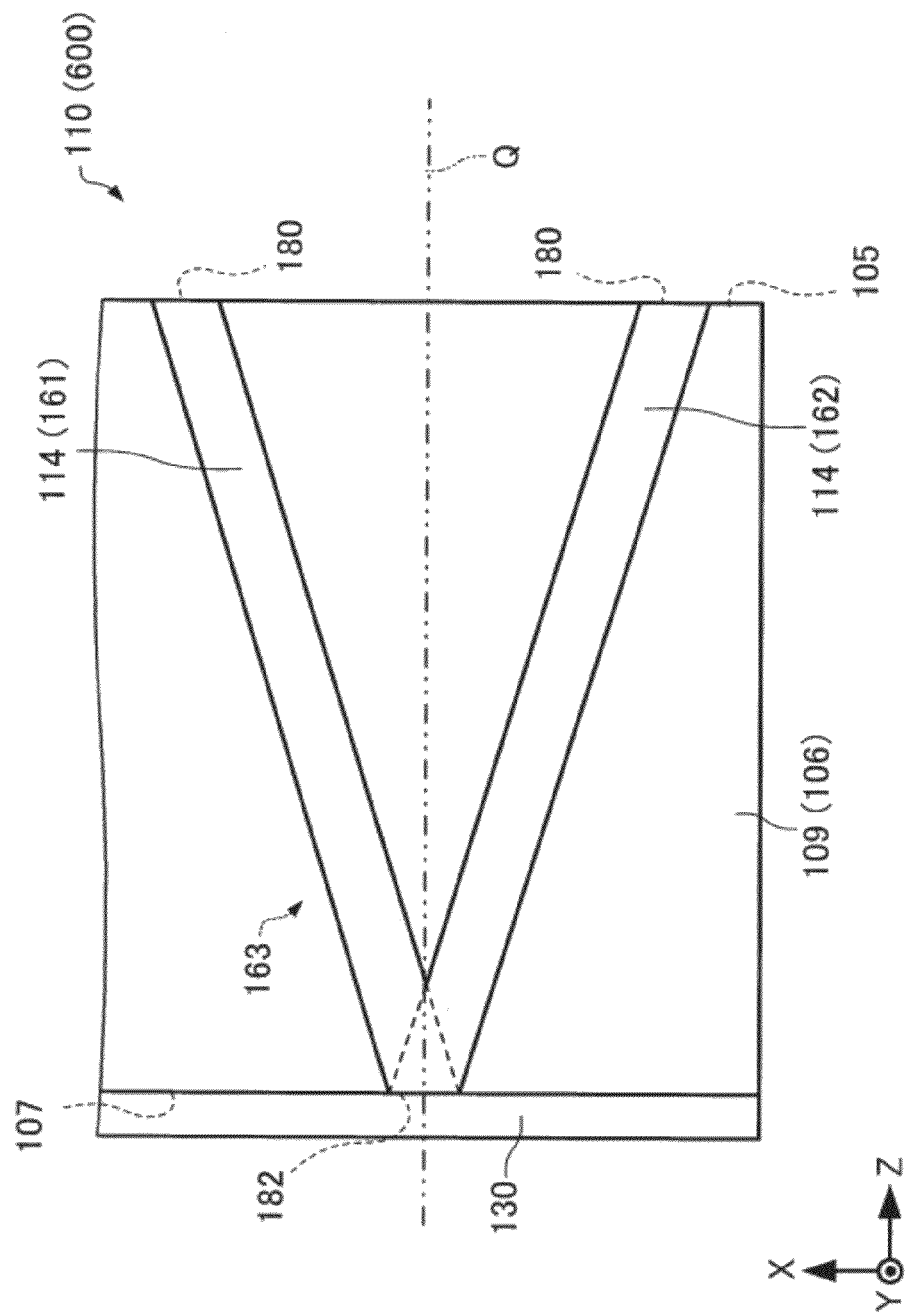
FIG. 17 is a plan view schematically showing a light emitting device of an illumination device according to a fifth modified example of the embodiment.

Next, an illumination device according to a fifth modified example of the embodiment will be explained with reference to the drawings. FIG. 17 is a plan view schematically showing the light emitting device 110 of an illumination device 600 according to the fifth modified example of the embodiment corresponding to FIG. 8.

As the light emitting device 110 of the illumination device 600, as shown in FIG. 17, a pair of gain regions 163 including a first gain region 161 and a second gain region 162 is used as the tilted gain region 160. Although not illustrated, for example, plural pairs of gain regions 163 are provided and arranged along the X-axis direction.

The first gain region 161 is tilted toward one side with respect to the perpendicular Q of the first side surface 105 and provided from the first side surface 105 to the second side surface 107. The second gain region 162 is tilted toward the other side (different from the one side) with respect to the perpendicular Q and provided from the first side surface 105 to the second side surface 107. In the illustrated example, the first gain region 161 and the second gain region 162 are provided symmetrically with respect to the perpendicular Q.

A first end surface 180 (output surface 180) of the first gain region 161 and a first end surface 180 of the second gain region 162 are separated from each other. On the other hand, a second end surface 182 (reflection surface 182) of the first gain region 161 and a second end surface 182 of the second gain region 162 overlap at least partially on the second side surface 107, and completely overlap in the illustrated example. That is, the pair of gain regions 163 may have a planar shape of a V shape seen from the stacking direction of the light emitting device 110.

For example, part of the light generated in the first gain region 161 is reflected on the second side surface 107 (second end surface 182) and output from the first end surface 180 of the second gain region 162, and its light intensity is amplified in the meantime. Similarly, part of the light generated in the second gain region 162 is reflected on the second side surface 107 and output from the first end surface 180 of the first gain region 161, and its light intensity is amplified in the meantime. Note that, the light generated in the first gain region 161 may include light directly output from the first end surface 180 of the first gain region 161. Similarly, the light generated in the second gain region 162 may include light directly output from the first end surface 180 of the second gain region 162.

According to the illumination device 600, like the illumination device 300, the symmetry in the angular distribution seen as the entire illumination light may be further improved as compared to the example of the illumination device 100.

2.6. Sixth Modified Example

Figure 18:
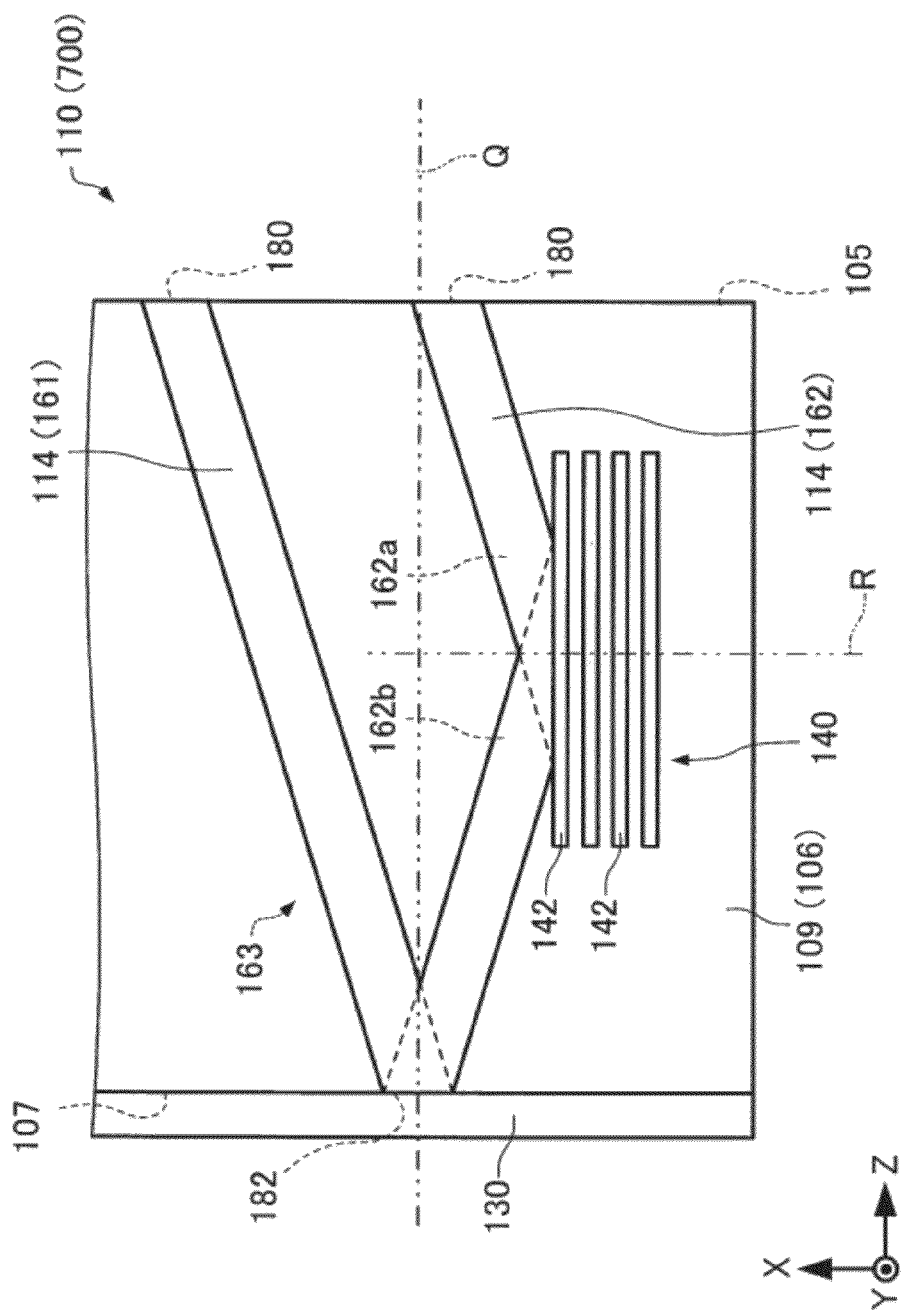
FIG. 18 is a plan view schematically showing a light emitting device of an illumination device according to a sixth modified example of the embodiment.

Next, an illumination device according to a sixth modified example of the embodiment will be explained with reference to the drawings. FIG. 18 is a plan view schematically showing the light emitting device 110 of an illumination device 700 according to the sixth modified example of the embodiment corresponding to FIG. 17. In the illumination device 700 according to the sixth modified example of the embodiment, the same reference signs are assigned to members having the same functions as the component members of the illumination device 600 according to the fifth modified example of the embodiment, and their detailed explanation will be omitted.

The light emitting device 110 of the illumination device 700 has a reflection part 140 as shown in FIG. 18. The reflection part 140 is provided inside of an outer periphery of the active layer 106 in a plan view (seen from the Y-axis direction). As the reflection part 140, for example, a DBR (Distributed Bragg Reflector) mirror including plural grooves 142 arranged at predetermined intervals may be used. Although not illustrated, it is desirable that the bottom surfaces of the grooves 142 are located lower than the lower surface of the active layer 106. The interior of the groove 142 may be hollow (air) or filled with an insulating member. In the illustrated example, four of the grooves 142 are provided, however, the number of grooves is not limited thereto. The reflection part 140 may reflect the light generated in the first gain region 161 and the second gain region 162.

The second gain region 162 includes a first part 162a and a second part 162b. The first part 162a is provided from the first side surface 105 to the reflection part 140. The first part 162a may have a first end surface 180. The first part 162a is parallel to the first gain region 161, for example. The second part 162b is provided from the reflection part 140 to the second side surface 107. The second part 162b may have a second end surface 182. The first part 162a and the second part 162b overlap in the reflection part 140. In the illustrated example, the first part 162a and the second part 162b are provided symmetrically with respect to an imaginary line R orthogonal to the perpendicular Q of the first side surface 105.

For example, part of light generated in the first gain region 161 is reflected on the second side surface 107 and the reflection part 140 and output from the first end surface 180 of the second gain region 162 (first part 162a).

In the illumination device 700, the optical axis of the light output from the first end surface 180 of the first gain region 161 and the optical axis of the light output from the first end surface 180 of the second gain region 162 may be made (nearly) in parallel. Accordingly, in the illumination device 700, for example, the design of the optical system including the optical axis conversion device 20 may be simplified as compared to the illumination device 600.

2.7. Seventh Modified Example

Figure 19:
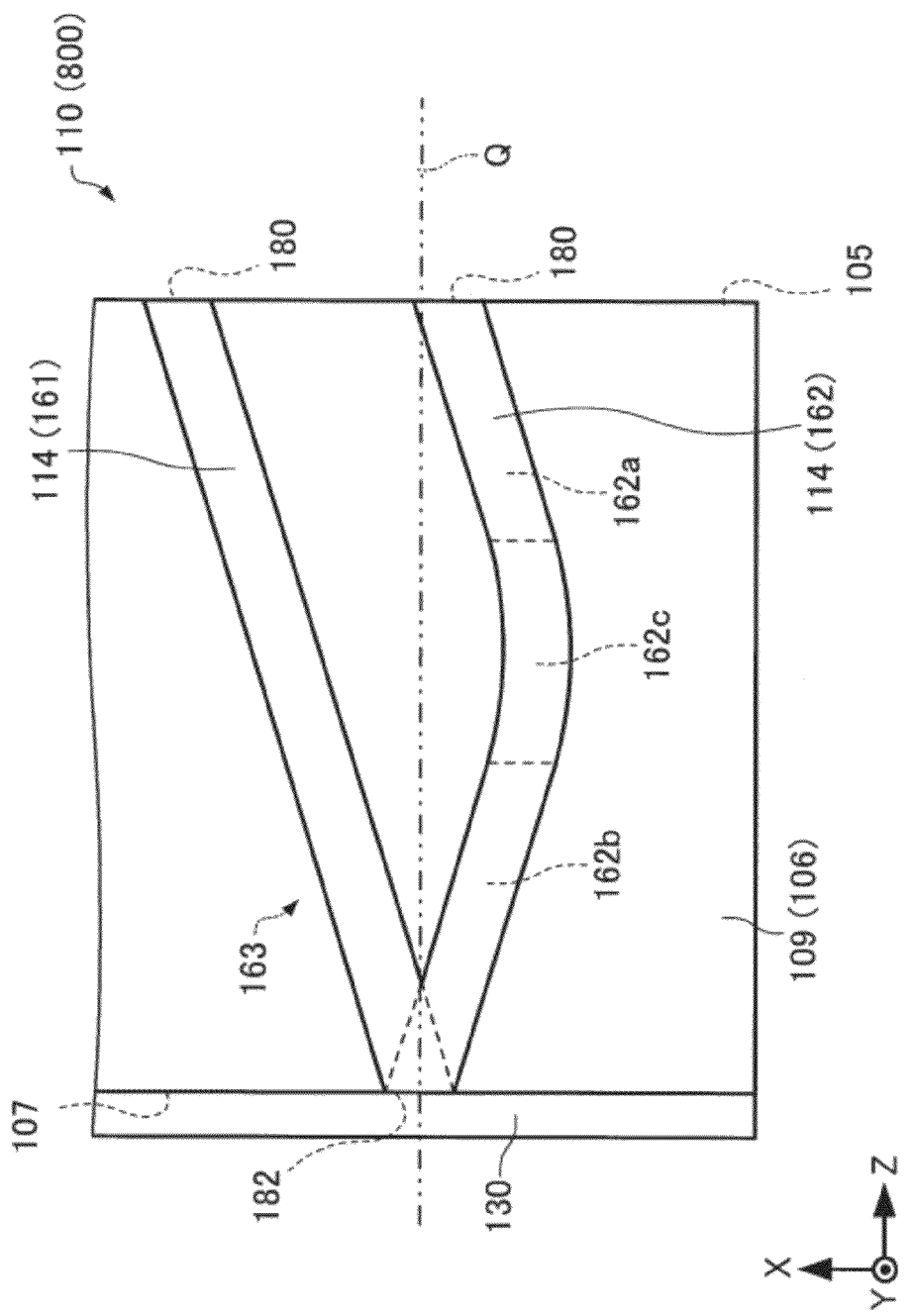
FIG. 19 is a plan view schematically showing a light emitting device of an illumination device according to a seventh modified example of the embodiment.

Next, an illumination device according to a seventh modified example of the embodiment will be explained with reference to the drawings. FIG. 19 is a plan view schematically showing the light emitting device 110 of an illumination device 800 according to the seventh modified example of the embodiment corresponding to FIG. 18. In the illumination device 800 according to the seventh modified example of the embodiment, the same reference signs are assigned to members having the same functions as the component members of the illumination device 700 according to the sixth modified example of the embodiment, and their detailed explanation will be omitted.

The light emitting device 110 of the illumination device 800 does not have the reflection part 140 unlike the light emitting device 110 of the illumination device 700 as shown in FIG. 19, however, the optical axis of the light output from the first end surface 180 of the first gain region 161 and the optical axis of the light output from the first end surface 180 of the second gain region 162 may be made (nearly) in parallel.

In the illumination device 800, the second gain region 162 has a third part 162c having a planar shape of an arc (or an oval arc). The third part 162c is provided between the first part 162a and the second part 162b of the second gain region 162. More specifically, the first part 162a is linearly extended from the first side surface 105 and connected to the third part 162c. Further, the second part 162b is linearly extended from the second side surface 107 and connected to the third part 162c.

For example, part of the light generated in the first gain region 161 is reflected on the second side surface 107, and then, while traveling within the third part 162c, the traveling direction is bent and output from the first end surface 180 of the first part 162a. Accordingly, as described above, in the illumination device 800, the optical axis of the light output from the first end surface 180 of the first gain region 161 and the optical axis of the light output from the first end surface 180 of the second gain region 162 may be made (nearly) in parallel.

3. Projector

Figure 20:
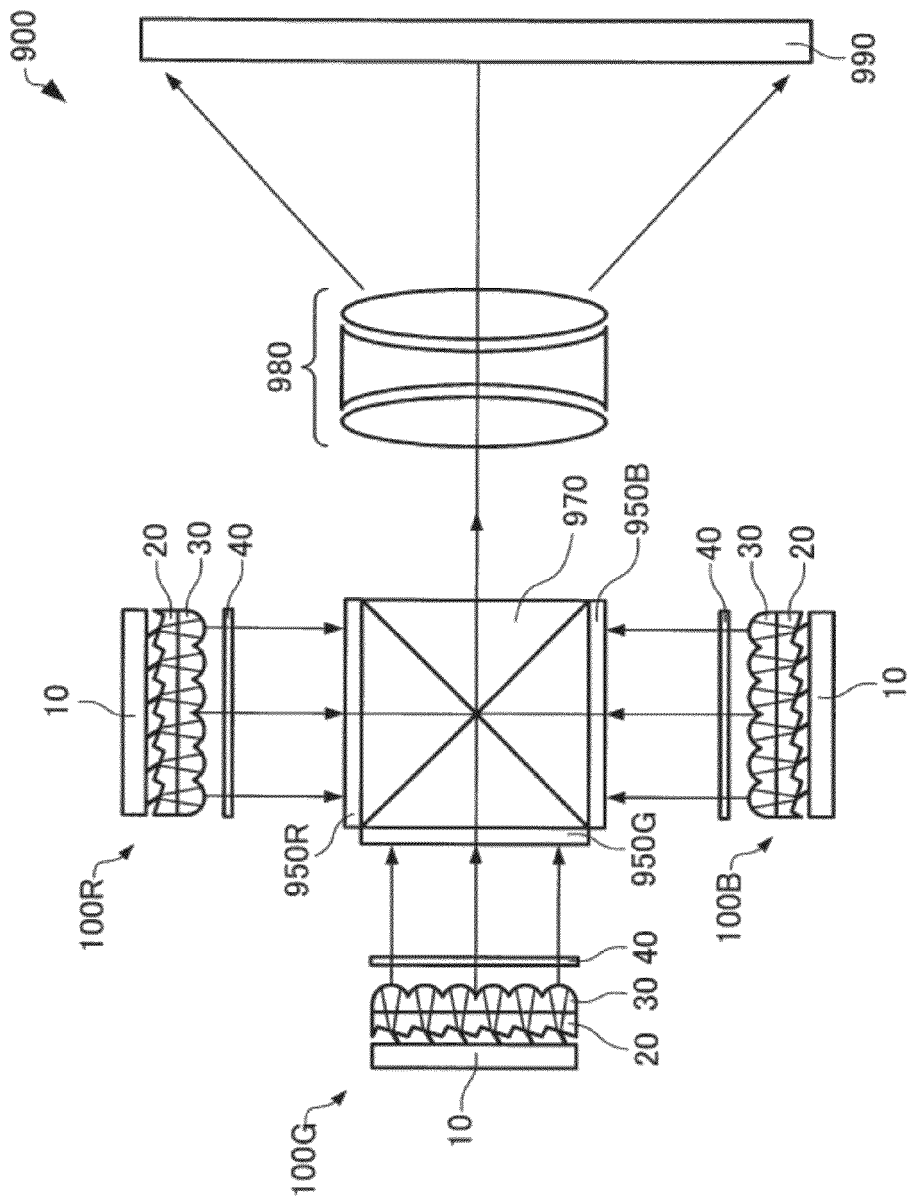
FIG. 20 schematically shows a projector according to an embodiment.

Next, a projector according to the embodiment will be explained with reference to the drawings. FIG. 20 schematically shows a projector 900 according to the embodiment. Note that, in FIG. 20, for convenience, a casing of the projector 900 is omitted for illustration.

The projector 900 may include a red illumination device that outputs red light, a green illumination device that outputs green light, and a blue illumination device that outputs blue light. As the respective illumination devices of the projector 900, the illumination devices according to the invention may be used. As shown in FIG. 20, an example using the illumination device 100 (the red illumination device 100R, the green illumination device 100G, the blue illumination device 100B) as the illumination device of the projector 900 will be explained.

The projector 900 further includes transmissive liquid crystal light valves (light modulation devices) 950R, 950G, 950B, a cross dichroic prism (color light combining means) 970, and a projection lens (projection device) 980.

The light output from the respective illumination devices 100R, 100G, 100B enter the respective liquid crystal light valves 950R, 950G, 950B. The respective liquid crystal light valves 950R, 950G, 950B respectively modulate incident light in response to image information. Note that the liquid crystal light valves 950R, 950G, 950B correspond to the illumination target 50 shown in FIG. 1.

The three colors of light modulated by the respective liquid crystal light valves 950R, 950G, 950B enter the cross dichroic prism 970. The cross dichroic prism 970 is formed by bonding four right angle prisms, for example, and a dielectric multilayer film that reflects red light and a dielectric multilayer film that reflects blue light are provided crosswise on its inner surface. By the dielectric multilayer films, the three colors of light are combined and light representing a color image is formed.

The light combined by the cross dichroic prism 970 enters the projection lens 980 as a projection system. The projection lens 980 enlarges the images formed by the liquid crystal light valves 950R, 950G, 950B and projects them on a screen (display surface) 990.

Note that, as described above, the light distribution angles (angular distributions) of the light output from the illumination devices 100R, 100G, 100B are set to be projectable angles in the projection lens 980. More specifically, the light distribution angles of the light output from the illumination devices 100R, 100G, 100B are set to be equal to or less than about 20°.

Further, in the above described example, the transmissive liquid crystal light valves have been used as light modulation devices, however, other light valves may be used, or reflective light valves may be used. As the light valves, for example, reflective liquid crystal light valves and digital micromirror devices are cited. Further, the configuration of the projection system may be appropriately changed depending on the type of light valves.

According to the projector 900, the illumination device according to the invention (for example, the illumination device 100) may be included. According to the illumination device 100, the liquid crystal light valves (light modulation devices) may be uniformly illuminated by illumination light with high symmetry, but without illuminance irregularities. Accordingly, in the projector 900, higher image quality (higher brightness and higher contrast) of the projection image may be realized.

The above described embodiments and modified examples are just examples, and the invention is not limited to these. For example, the respective embodiments and the respective modified examples may be appropriately combined.

The embodiments of the invention have been specifically explained above, and a person skilled in the art could easily understand that many modifications without substantively departing from the spirit and effects of the invention are possible. Therefore, these modified examples are included in the range of the invention.

The entire disclosure of Japanese Patent Application No. 2011-050397 filed Mar. 8, 2011 is expressly incorporated herein by reference.

What is claimed is:

1. An illumination device comprising:
a light source including a plurality of light emitting devices that generate and guide light, the light emitting devices being arranged in a predetermined pattern relative to one another and having tilted gain regions wherein guiding directions of the light are tilted with respect to a perpendicular of output surfaces of the light source;
an optical axis conversion device that bends optical axes of the light output from the light source; and
a light distribution control device that controls a light distribution angle of the light output from the optical axis conversion device,
wherein the light emitting devices are super luminescent diodes, and
the light output from the light distribution control device diverge.

2. The illumination device according to claim 1, further comprising a diffusion device that diffuses the light output from the light distribution control device.

3. The illumination device according to claim 2, further comprising a light guide that guides the light output from the diffusion device to an illumination target.

4. The illumination device according to claim 1, wherein the optical axis conversion device and the light distribution control device are integrally formed.

5. The illumination device according to claim 1, wherein the light emitting device includes a first tilted gain region in which the guiding direction of the light is tilted in a first direction with respect to the perpendicular of the output surfaces, and a second tilted gain region in which the guiding direction of the light is tilted in a second direction with respect to the perpendicular of the output surfaces, the first and second directions being different.

6. The illumination device according to claim 1, wherein the light source includes a first light emitting device having a first tilted gain region in which the guiding direction of the light is tilted in a first direction with respect to the perpendicular of the output surfaces, and a second light emitting device having a second tilted gain region in which the guiding direction of the light is tilted in a second direction with respect to the perpendicular of the output surfaces, the first and second directions being different.

7. A projector comprising:
an illumination device;
a light modulation device that modulates light output from the illumination device; and
a projection device that projects an image formed by the light modulation device,
the illumination device including:
a light source including a plurality of light emitting devices that generate and guide light, the light emitting devices being arranged in a predetermined pattern relative to one another and having tilted gain regions wherein guiding directions of the light are tilted with respect to a perpendicular of output surfaces of the light source,
an optical axis conversion device that bends optical axes of the light output from the light source, and
a light distribution control device that controls a light distribution angle of the light output from the optical axis conversion device,
wherein the light emitting devices are super luminescent diodes, and
the light output from the light distribution control device diverge.

8. The projector according to claim 7, further comprising a diffusion device that diffuses the light output from the light distribution control device.

9. The projector according to claim 8, further comprising a light guide that guides the light output from the diffusion device to an illumination target.

10. The projector according to claim 7, wherein the optical axis conversion device and the light distribution control device are integrally formed.

11. The projector according to claim 7, wherein the light emitting device includes a first tilted gain region in which the guiding direction of the light is tilted in a first direction with respect to the perpendicular of the output surfaces, and a second tilted gain region in which the guiding direction of the light is tilted in a second direction with respect to the perpendicular of the output surfaces, the first and second directions being different.

12. The projector according to claim 7, wherein the light source includes a first light emitting device having a first tilted gain region in which the guiding direction of the light is tilted in a first direction with respect to the perpendicular of the output surfaces, and a second light emitting device having a second tilted gain region in which the guiding direction of the light is tilted in a second direction with respect to the perpendicular of the output surfaces, the first and second directions being different.

13. The projector according to claim 7, wherein a light distribution angle of the light controlled by the light distribution control device is an angle that is projectable by the projection device.

* * * * *